United States Patent
Song et al.

(10) Patent No.: US 11,178,649 B2
(45) Date of Patent: *Nov. 16, 2021

(54) METHODS AND SYSTEMS FOR TDD PUCCH HARQ RESOURCE ALLOCATION FOR ENHANCED PHYSICAL DOWNLINK CONTROL CHANNEL (EPDCCH)

(71) Applicant: Telefonaktiebolaget LM Ericsson (publ), Stockholm (SE)

(72) Inventors: Xinghua Song, Beijing (CN); Erik Eriksson, Linköping (SE); Daniel Larsson, Vallentuna (SE); Shaohua Li, Beijing (CN); Qianxi Lu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 94 days.

This patent is subject to a terminal disclaimer.

(21) Appl. No.: 16/666,597

(22) Filed: Oct. 29, 2019

(65) Prior Publication Data

US 2020/0068560 A1 Feb. 27, 2020
US 2021/0204273 A9 Jul. 1, 2021

Related U.S. Application Data

(63) Continuation of application No. 15/927,536, filed on Mar. 21, 2018, now Pat. No. 10,499,380, which is a (Continued)

(30) Foreign Application Priority Data

Sep. 27, 2012 (WO) ................ PCT/CN2012/082198

(51) Int. Cl.
*H04W 72/04* (2009.01)
*H04L 1/16* (2006.01)
(Continued)

(52) U.S. Cl.
CPC ....... *H04W 72/0413* (2013.01); *H04L 1/1607* (2013.01); *H04L 1/1812* (2013.01);
(Continued)

(58) Field of Classification Search
CPC . H04W 72/00; H04W 72/04; H04W 72/0413; H04W 72/042; H04W 72/0406;
(Continued)

(56) References Cited

U.S. PATENT DOCUMENTS 9,955,461 B2 * 4/2018 Song .................. H04L 1/1854
10,499,380 B2 * 12/2019 Song .................... H04L 5/14
(Continued)

FOREIGN PATENT DOCUMENTS

CA 2828947 A1 9/2012
CN 101222291 A 7/2008
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.6.0, Jun. 2012, pp. 1-124.
(Continued)

*Primary Examiner* — Jamal Javaid
(74) *Attorney, Agent, or Firm* — Murphy, Bilak & Homiller, PLLC

(57) ABSTRACT

PUCCH resource determination for HARQ-ACK transmission in response to ePDCCH-scheduled PDSCH or ePDCCH-indicated SPS release in a TDD radio communication system. Downlink control information (DCI) is received in a downlink subframe via an Enhanced Physical Downlink Control Channel (ePDCCH). A resource index for a Physical Uplink Control Channel (PUCCH) resource is determined, based on the lowest enhanced Control Channel
(Continued)

Element (eCCE) index of the received DCI, a device-specific offset value, and an index i that identifies the downlink subframe in a pre-determined set of one or more downlink subframes associated with an uplink subframe. The PUCCH resource is determined according to a formula that results in a sequential allocation of PUCCH resources in the uplink subframe with respect to the downlink subframes associated with the uplink subframe, for each of a plurality of sets of ePDCCH resources. HARQ feedback is transmitted in the uplink subframe, in the indexed PUCCH resource.

12 Claims, 14 Drawing Sheets

Related U.S. Application Data continuation of application No. 14/114,762, filed as application No. PCT/SE2013/051116 on Sep. 26, 2013, now Pat. No. 9,955,461.

(51) Int. Cl.
  *H04L 1/18* (2006.01)
  *H04L 5/00* (2006.01)
  *H04L 5/14* (2006.01)
(52) U.S. Cl.
  CPC .......... *H04L 1/1854* (2013.01); *H04L 1/1887* (2013.01); *H04L 5/0055* (2013.01); *H04L 5/14* (2013.01); *H04W 72/042* (2013.01); *H04L 5/0007* (2013.01)
(58) Field of Classification Search
  CPC ........ H04W 72/02; H04L 5/14; H04L 5/0055; H04L 1/1854; H04L 1/1812; H04L 1/1607; H04L 1/1887
  See application file for complete search history.

(56) References Cited

U.S. PATENT DOCUMENTS

| | | | |
|---|---|---|---|
| 2011/0205992 | A1 | 8/2011 | Rudolf et al. |
| 2011/0243039 | A1 | 10/2011 | Papasakellariou et al. |
| 2011/0243066 | A1 | 10/2011 | Nazar et al. |
| 2012/0263121 | A1 | 10/2012 | Chen et al. |
| 2013/0242770 | A1* | 9/2013 | Chen ............ H04L 47/6275 370/252 |
| 2013/0322352 | A1 | 12/2013 | Han et al. |
| 2014/0241298 | A1 | 8/2014 | Park et al. |

FOREIGN PATENT DOCUMENTS

| | | |
|---|---|---|
| CN | 101489255 A | 7/2009 |
| CN | 101594205 A | 12/2009 |
| CN | 101605356 A | 12/2009 |
| CN | 101789851 A | 7/2010 |
| CN | 101801090 A | 8/2010 |
| CN | 101883369 A | 11/2010 |
| CN | 101895988 A | 11/2010 |
| CN | 102474865 A | 5/2012 |
| EP | 2421191 A2 | 2/2012 |
| JP | 2014511057 A | 5/2014 |
| JP | 2015516125 A | 6/2015 |
| WO | 2012118356 A2 | 9/2012 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, pp. 1-125.
Unknown, Author, "Allocation of ePDCCH resources", 3GPP TSG-RAN WG1 #70 R1-123615, Qingdao, China, Aug. 13-17, 2012, pp. 1-3.
Unknown, Author, "Discussion on DL/UL control channel for HARQ with ePDCCH", LG Electronics, 3GPP TSG RAN WG1 Meeting #66 bis, R1-113197, Zhuhai, China, Oct. 10-14, 2011, pp. 1-4.
Unknown, Author, "HARQ-ACK PUCCH Resources in Response to ePDCCH Detections", 3GPP TSG RAN WG1 #69, R1-122259, Prague, Czech Republic, May 21-25, 2012, pp. 1-2.
Unknown, Author, "PUCCH Resource Allocation for ePDCCH", 3GPP TSG-RAN WG1 Meeting #70 R1-123870, Qingdao, China, Aug. 13-17, 2012, pp. 1-3.
Unknown, Author, "PUCCH Resource Efficiency for E-PDCCH", Research in Motion, UK Limited, 3GPP TSG RAN WG1 Meeting #70, R1-123623, Qingdao, P.R. China, Aug. 13-17, 2012, pp. 1-6.
Unknown, Author, "PUCCH Resource for E-PDCCH", 3GPP TSG RAN WG1 Meeting #70, R1-123227, Qingdao, China, 1-3., Aug. 13-17, 2012, pp. 1-3.
Unknown, Author, "Pucch resource mapping with ePDCCH", 3GPP TSG RAN WG1 Meeting #67, R1-114066, San Francisco, USA, Nov. 14-18, 2011, pp. 1-2.
Unknown, Author, "Remaining details of PUCCH resource allocation for EPDCCH", Ericsson, ST-Ericsson, 3GPP TSG-RAN WG1 #71, R1-124896, New Orleans, USA, Nov. 12-16, 2012, pp. 1-4.

* cited by examiner

METHODS AND SYSTEMS FOR TDD PUCCH HARQ RESOURCE ALLOCATION FOR ENHANCED PHYSICAL DOWNLINK CONTROL CHANNEL (EPDCCH)

TECHNICAL FIELD

The present invention generally relates to wireless communication networks, and particularly relates to the allocation of uplink control channel resources within such networks.

BACKGROUND

The 3rd-Generation Partnership Project (3GPP) has developed specifications for a fourth-generation wireless communications technology known as "Long Term Evolution," or "LTE." LTE uses Orthogonal Frequency Division Multiplexing (OFDM) in the downlink and DFT-spread OFDM in the uplink, where DFT denotes "Discrete Fourier Transform". The basic LTE physical resources can thus be seen as a time-frequency grid, as illustrated in FIG. 1, where each resource element corresponds to one subcarrier during one OFDM symbol interval on a particular antenna port. An antenna port is defined such that the channel over which a symbol on the antenna port is conveyed can be inferred from the channel over which another symbol on the same antenna port is conveyed. There is one resource grid per antenna port.

In the time domain, LTE downlink transmissions are organized into radio frames of ten milliseconds. Each radio frame includes ten equally sized subframes of one millisecond. FIG. 2 illustrates this arrangement—one sees from the diagram that each subframe is divided into two slots, with each slot having a duration of 0.5 milliseconds.

Resource allocation in LTE is described in terms of "Physical Resource Blocks," or "PRBs." As shown in FIG. 3, a PRB corresponds to one slot in the time domain and twelve contiguous 15-kHz subcarriers in the frequency domain. The bandwidth, $N_{BW}$, of the overall system determines the number of PRBs in each slot, and each PRB spans six or seven OFDM symbols, depending upon the length of the cyclic prefix (CP) used. Two consecutive PRBs in time represent a PRB pair. User scheduling by the LTE base station, referred to as an "eNodeB" or "eNB", is generally performed using the PRB pair as the smallest unit of resource allocation.

Transmissions in LTE are dynamically scheduled based on transmitting downlink assignments and uplink grants to targeted mobile terminals (referred to as "user equipment," or "UEs," in 3GPP terminology). According to Release 8 of the 3GPP standards, which was the first release to include specifications for LTE, the downlink assignments and uplink grants are transmitted in a defined control region using Physical Downlink Control Channels (PDCCHs) targeted to specific UEs. The search space for PDCCH reception, which defines those resources in any given subframe that might include control information for the UEs, is known to the UEs. The UEs thus blindly decode those portions of the received signal to find PDCCHs targeted to them.

More broadly, PDCCHs are used to convey UE-specific scheduling assignments for the downlink and uplink grants, as noted, and are further used for Physical Random Access Channel (PRACH) responses, uplink power control commands, and common scheduling assignments for signaling messages that include, among other things, system information and paging.

FIG. 4 illustrates that a "normal" downlink subframe includes a control region at the beginning of the subframe, followed by a data region. The size of the control region in which PDCCHs are transmitted can vary in size from one to four OFDM symbols in dependence on the involved configuration. A Physical Control Format Indicator Channel (PCFICH) is used to indicate the control region length and is transmitted within the control region at locations known by the UEs. A UE thus learns the size of the control region in a given downlink subframe by decoding the PCFICH transmitted in that subframe, and therefore knows in which OFDM symbol the data transmission starts.

PDCCHs are made up of Control Channel Elements (CCEs), where each CCE consists of nine Resource Element Groups (REGs). Each REG in turn consists of four resource elements (REs). LTE defines four PDCCH formats 0-3, which use aggregation levels of 1, 2, 4, and 8 CCEs, respectively. Given the modulation format used for PDCCH transmission, two bits can be transmitted on each individual RE aggregated within a PDCCH; with 1 CCE=9 REGs=36 REs and 2 bits/symbol, one can transmit 72 bits via a format 0 PDCCH, 144 bits via a format 1 PDCCH, etc. As noted, PDCCHs are transmitted in the defined control region—the first 1-4 symbols—of any given downlink subframe and extend over substantially the entire system bandwidth. Thus, the size of the control region in the given downlink subframe and the overall system bandwidth define the number of overall CCEs available for PDCCH transmission.

FIG. 4 also illustrates the presence of Cell-specific Reference Signals (CRS) within the downlink subframe. The locations and values of CRS are known by the UEs, which use the received CRS for estimation of the radio channel. The channel estimates are in turn used in the demodulation of data by the UEs. CRS are also used for mobility measurements performed by the UEs.

Because the CRS are common to all UEs in a cell, the transmission of CRS cannot be easily adapted to suit the needs of a particular UE. Therefore, LTE also supports UE-specific reference symbols generally intended only for assisting channel estimation for demodulation purposes. These UE-specific RS are referred to as Demodulation Reference Symbols (DMRS). DMRS for a particular UE are placed in the data region of the downlink subframe, as part of Physical Downlink Shared Channel (PDSCH) transmissions.

Release 11 of the 3GPP standards introduced the enhanced PDCCH (ePDCCH) as an additional, and more flexible, channel for transmitting control messages to UEs. An ePDCCH uses resources in the data region associated with PDSCH transmissions, rather than resource elements within the defined control region at the beginning of the subframe. See "Universal Mobile Telecommunications System (UMTS); Technical Specifications and Technical Reports for a UTRAN-based 3GPP system", 3GPP TS 21.101, v.11.0.0.

FIG. 5 provides a basic illustration of PRB pairs allocated from the data region of a downlink subframe, for use in the transmission of given ePDCCHs. The remaining PRB pairs in the data portion of the subframe can be used for PDSCH transmissions; hence the ePDCCH transmissions are frequency multiplexed with PDSCH transmissions. That arrangement differs from PDCCH transmissions, which are time multiplexed with respect to PDSCH transmissions—i.e., PDCCH transmissions occur only in the control portion of the downlink subframe, which occurs in time before the data portion in which PDSCH transmissions are performed.

Resource allocation for PDSCH transmissions can be according to several resource allocation types, depending on the downlink control information (DCI) format. Some resource allocation types have a minimum scheduling granularity of a resource block group (RBG). An RBG is a set of adjacent (in frequency) resource blocks. When scheduling the UE according to these resource allocation types, the UE is allocated resources in terms of RBGs, rather than according to individual resource blocks (RBs) or RB pairs.

When a UE is scheduled in the downlink from an ePDCCH, the UE shall assume that the PRB pairs carrying the downlink assignment are excluded from the resource allocation, i.e., rate matching applies. For example, if a UE is scheduled to receive PDSCH in a certain RBG that consists of three adjacent PRB pairs, and if one of these PRB pairs contains the downlink assignment, then the UE shall assume that the PDSCH is transmitted in only the two remaining PRB pairs in this RBG. Notably, Release 11 does not support multiplexing of PDSCH and ePDCCH transmission within the same PRB pair.

ePDCCH messages are made up of enhanced Control Channel Elements (eCCEs), which are analogous to the CCEs used in the PDCCH. For purposes of mapping ePDCCH messages to PRB pairs, each PRB pair is divided into sixteen enhanced resource element groups (eREGs). Each eCCE is made up of four or eight of these eREGs, for normal and extended cyclic prefix, respectively. An ePDCCH is consequently mapped to a multiple of either four or eight eREGs, depending on the aggregation level. The eREGs belonging to a particular ePDCCH resides in either a single PRB pair (as is typical for localized transmission) or a multiple of PRB pairs (as is typical for distributed transmission).

One example of the possible division of a PRB pair into eREGs is illustrated in FIG. 6, which illustrates an unconstrained subframe. Each block or tile in the figure is an individual resource element (RE) and the tile number corresponds to the EREG that the RE is grouped within. For example, tiles having the dotted background all belong to same EREG indexed at 0.

A UE can be configured so that multiple sets of PRB pairs are available for use as ePDCCH resources. Each ePDCCH resource set consists of N=2, 4, or 8 PRB pairs. In addition, two modes of ePDCCH transmission are supported, i.e., localized and distributed ePDCCH transmission. Each set of ePDCCH resources is independently configured as being of localized or distributed type. In distributed transmission, an ePDCCH is mapped to resource elements in an ePDCCH set in a distributed manner, i.e., using multiple PRB pairs that are separated from each other in frequency. In this way, frequency diversity can be achieved for the ePDCCH message. As of Release 11, the ePDCCH can be mapped to resource elements in up to D PRB pairs, where D=2, 4, or 8 (the value of D=16 is also being considered in 3GPP). FIG. 7A illustrates an example of distributed transmission, where D=4 is illustrated. As seen in the example, the ePDCCH is divided into four parts, which are mapped to different PRB pairs. These four parts may correspond to eCCEs, for example.

In a localized transmission, on the other hand, an ePDCCH is mapped to one PRB pair only, if the space allows. Mapping to a single PRB pair is always possible for aggregation levels one and two, and is possible also for aggregation level four for the case of a normal, "unconstrained" subframe and a normal CP length. Here, an "unconstrained" or normal subframe is one having a PDSCH region that is not abbreviated. Constrained subframes include "special" subframes in TDD LTE that include uplink and downlink portions, and subframes that are given over to another purpose, such as Multicast-Broadcast Single Frequency Network (MBSFN) transmissions. The number of eCCEs that fit into one PRB pair is given by Table 1, below. Thus, for example, in a normal subframe with a normal CP length, localized transmission using aggregation levels of 1, 2, or 4 uses only a single PRB pair, while localized transmission using an aggregation level of 8 requires the use of two PRB pairs.

TABLE 1

Number of eCCEs per PRB pair in localized transmission

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 2 | |

In case the aggregation level of the ePDCCH is too large, a second PRB pair is used as well, and so on, using more PRB pairs, until all eCCEs belonging to the ePDCCH have been mapped. FIG. 7B illustrates an example of localized transmission. In this example, the same four parts of the ePDCCH are mapped to a single PRB pair.

As described above, certain downlink resources are made available for sending PDCCH and ePDCCH messages to the UE. However, a given UE is not targeted to receive control channel messages in every subframe. Further, the UE does not know in advance precisely where a control channel message will be located among the resources made available for the control channel messages. Thus, the UE must search for a control message that may not exist, in each of several possible locations for the message. The concept of a "search space" is used to define a range of possible locations for control messages, to keep the required amount of searching to a reasonable level.

For the PDCCH, Release 8 of the 3GPP specifications for LTE define a search space $S_k^{(L)}$ for each of the possible aggregation levels L∈{1,2,4,8} This search space is defined by a contiguous set of CCEs given by the following:

$$(Z_k^{(L)} + i) \bmod N_{CCE,k} \quad (1)$$

where $N_{CCE,k}$ is the total number of CCEs in the control region of subframe k, $Z_k^{(L)}$ defines the start of the search space. i is an index value that ranges according to i=0, 1, ..., $M^{(L)} \cdot L - 1$, where $M^{(L)}$ is a pre-determined number of PDCCHs to monitor in the given search space, which depends on the aggregation level. Table 2, which is reproduced from Table 9.1.1-1 of 3GPP TS 36.213, "Physical Layer Procedures (Release 8)," provides the values of $M^{(L)}$ for each of the possible aggregation levels L. Each CCE contains 36 QPSK modulation symbols.

TABLE 2

$M^{(L)}$ vs. Aggregation Level L for PDCCH

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |

TABLE 2-continued

M$^{(L)}$ vs. Aggregation Level L for PDCCH

Search space S$_k$$^{(L)}$

| Type | Aggregation level L | Size [in CCEs] | Number of PDCCH candidates M$^{(L)}$ |
|---|---|---|---|
| | 4 | 8 | 2 |
| | 8 | 16 | 2 |
| Common | 4 | 16 | 4 |
| | 8 | 16 | 2 |

It should be noted that with this definition, search space for different aggregation levels may overlap with each other, regardless of system bandwidth. More specifically, UE-specific search space and common search space might overlap and the search spaces for different aggregation levels might overlap. One example is shown below, in Table 3, where there are nine CCEs in total and very frequent overlap between PDCCH candidates.

TABLE 3

N$_{CCE,k}$ = 9, Z$_k$$^{(L)}$ = {1, 6, 4, 0} for L = {1, 2, 4, 8}, respectively.

Search space S$_k$$^{(L)}$

| Type | Aggregation Level L | PDCCH candidates in terms of CCE index |
|---|---|---|
| UE-Specific | 1 | {1}, {2}, {3}, {4}, {5}, {6} |
| | 2 | {6, 7}, {8, 0}, {1, 2}, {3, 4}, {5, 6}, {7, 8} |
| | 4 | {4, 5, 6, 7}, {8, 0, 1, 2} |
| | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
| | 8 | {0, 1, 2, 3, 4, 5, 6, 7}, {8, 0, 1, 2, 3, 4, 5, 6} |

As is also the case for PDCCH, the ePDCCH is transmitted over radio resources shared by multiple UEs. The enhanced CCE (eCCE) is introduced as the equivalent of the CCE for PDCCH. Like a CCE, an eCCE also has a fixed number of resource elements. However, the number of resource elements actually available for ePDCCH mapping is generally fewer than the fixed number, because many resource elements are occupied by other signals such as Cell-specific Reference Signals (CRS) and Channel State Information-Reference Signal (CSI-RS). Code-chain rate matching is applied whenever a resource element belonging to an eCCE contains other colliding signals such as the CRS, CSI-RS, legacy control region or in case of Time Division Duplexing (TDD), the Guard Period (GP) and Uplink Pilot Time Slot (UpPTS).

Consider the example in FIG. 8, where item 40 illustrates the PDCCH mapping. The PDCCH always avoids the CRS, so that a CCE always contains T$_{avail}$=36 available resource elements. In item 42, on the other hand, it is shown how an eCCE contains 36 resource elements nominally, but the number of available resource elements is reduced in the event that there are colliding signals. Hence, T$_{avail}$≤36 resource elements for ePDCCH. Since the colliding signals are subframe dependent, the value of T$_{avail}$ becomes subframe dependent as well, and could even be different for different eCCEs, if the collisions impact on the eCCEs unevenly. It is noted that when the number of eCCEs per PRB pair is two (see Table 1), the nominal number of resource elements per eCCE is not 36, but instead is either 72 (for normal CP length) or 64 (for extended CP length).

As of Release 11 of the 3GPP standards for LTE, the ePDCCH supports only the UE-specific search space, whereas the common search space remains to be monitored in the PDCCH in the same subframe. In future releases, the common search space may be introduced also for ePDCCH transmission. The Release 11 standards specify that the UE monitors eCCE aggregation levels 1, 2, 4, 8, 16 and 32, with restrictions shown in Table 4 below, where n$_{EPDCCH}$ is the number of available resource elements for ePDCCH transmission in a PRB pair. In Table 4, distributed and localized transmission refers to the ePDCCH mapping to resource elements.

TABLE 4

Aggregation levels for ePDCCH

Aggregation levels

| | Normal subframes and special subframes, configuration 3, 4, 8, with n$_{EPDCCH}$ < 104 and using normal cyclic prefix | | All other cases | |
|---|---|---|---|---|
| ePDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

In distributed transmission, an ePDCCH can be mapped to resource elements in up to D PRB pairs, where D=2, 4, or 8 (the value of D=16 is also being considered in 3GPP). In this way, frequency diversity can be achieved for the ePDCCH message. See FIG. 7A for a schematic example in which a downlink subframe shows four parts belonging to an ePDCCH which is mapped to multiple of the enhanced control regions known as PRB pairs, to achieve distributed transmission and frequency diversity or sub-band precoding.

As of September 2012, the 3GPP has not reached agreement as to how four or eight eREGs respectively should be grouped into the eCCEs. It is also an open question as to how the encoded and modulated symbols of an ePDCCH message are mapped to the resource elements within the resources reserved by its associated eREGs. Further, the number of blind decodes per aggregation level for ePDCCH has not yet been decided in the 3GPP standardization work. Likewise, how randomization of the search space for localized and distributed mappings is generated has not yet been decided, although it is clear that overlap between ePDCCH candidates of different aggregation levels will occur also for the ePDCCH, as is the case for the PDCCH.

Time-Division Duplex (TDD) operation in LTE systems presents additional challenges with respect to PDCCH and ePDCCH to PUCCH mapping. These challenges to PUCCH HARQ-ACK resource determination arise from the asymmetry between uplink and downlink. When there are more downlink subframes than uplink subframes, the one to one mapping used in Frequency-Division Duplex (FDD) mode cannot be reused, since PUCCH resources selected according to this approach will collide with each other across different downlink subframes. On the other hand, overall HARQ-ACK resource utilization should be considered, since the resources for PUSCH transmission will be reduced if excessive uplink resources are reserved for PUCCH HARQ-ACK transmission. The TDD PUCCH resource for HARQ-ACK transmission in response to legacy PDCCH has been specified in the technical standardization document 3GPP TS 36.213, "Physical Layer Procedures," v10.6.0.

FIG. 9 provides an illustration of the allocation of PUCCH resources for PDCCH, in TDD mode. The illustrated example is for four downlink subframes (SF0, SF1, SF2, and SF3) and one uplink subframe (SF4). Therein the resource determination for HARQ-ACK multiplexing and HARQ-ACK bundling are similar and can be derived as specified in 3GPP TS 36.213 v10.6.0, "Physical Layer Procedures". It can be seen that the PUCCH HARQ-ACK resources will be stacked firstly for the lowest eCCE index of the DCI that fall within the first one-third CCEs of the control region, across multiple subframes (from SF 0 to SF 3) (marked with diagonal shading). These PUCCH HARQ-ACK resources are followed by the DCIs belonging to the second one-third CCEs of the control region (shaded). Finally are the last one-third CCEs (marked with cross-hatching). The design philosophy is that when system load is low, the control region could be automatically reduced by the dynamic signaling of PCFICH, hence the PUCCH HARQ-ACK resource could be compressed to a continuous region.

TDD PUCCH resource determination for ePDCCH has not been resolved in 3GPP RAN1 yet, i.e., no concrete solution is provided. However, a separate design different from FDD is needed, just as for PDCCH. Due to the fundamental differences in resource structures, the current design for PDCCH cannot be reused for ePDCCH. For example, PDCCH is a common control region (first one to four OFDM symbols) for all UEs while ePDCCH is multiplexed in frequency with PDSCH in a UE-specific manner. Accordingly, techniques for TDD PUCCH HARQ resource allocation for the Enhanced Physical Downlink Control Channel (ePDCCH) in radio communication systems are needed.

SUMMARY

According to several embodiments of the techniques disclosed herein, solutions are provided for PUCCH resource determination for HARQ-ACK transmission in response to ePDCCH-scheduled PDSCH or ePDCCH-indicated SPS release in a TDD radio communication system. Several different categories of embodiments are detailed below, each of which may have different combinations of PUCCH blocking probability, PUCCH resource utilization efficiency, eNB scheduler complexity and implementation complexity.

One example embodiment of the presently disclosed techniques is a processing method, suitable for implementation by a wireless device, for determining the resources for transmitting hybrid automatic-repeat-request (HARQ) feedback in a wireless communication network configured for time-division duplexing (TDD) operation. The example method begins with receiving downlink control information (DCI) via an Enhanced Physical Downlink Control Channel (ePDCCH) in a downlink subframe. The received ePDCCH schedules a downlink shared channel transmission to the wireless device or indicates a release of semi-persistent scheduling (SPS) to the wireless device. The method continues with determining a resource index for a Physical Uplink Control Channel (PUCCH) resource based on the lowest enhanced Control Channel Element (eCCE) index of the received DCI, a device-specific offset value previously signaled to the wireless device via Radio Resource Control (RRC) signaling, and an index i. The index i identifies the downlink subframe in a pre-determined set of one or more downlink subframes associated with an uplink subframe. The determining of the PUCCH resource is performed according to a formula that results in a sequential allocation of PUCCH resources in the uplink subframe with respect to the downlink subframes associated with the uplink subframe, for each of a plurality of sets of ePDCCH resources. The method continues with the transmitting of HARQ feedback in the uplink subframe, using a PUCCH resource that corresponds to the resource index.

In some embodiments, determining the resource index for the PUCCH resource comprises determining the resource index based on the sum of (i) the lowest enhanced eCCE of the received DCI, (ii) the device-specific offset value previously signaled to the wireless device via RRC signaling, and (iii) the product of the index i and the number of eCCEs in a set of ePDCCH resources that includes those ePDCCH resources used by the received ePDCCH. In some of these embodiments, the set of ePDCCH resources is set q of a plurality of sets of ePDCCH resources, wherein the uplink subframe is subframe n and the downlink subframe is subframe n-$k_i$, where $k_i$ is the i-th element in the pre-determined set of downlink subframes associated with subframe n, the pre-determined set comprising M elements indexed according to $k_0, k_1, \ldots, k_{M-1}$, and determining the resource index comprises calculating: $n_{PUCCH,i}^{(1)} = i \cdot N_q^{eCCE} + n_{eCCE,i} + N_{UE-PUCCH}^{(q)}$, where $n_{eCCE,i}$ is the lowest eCCE index of the received DCI and $N_q^{eCCE}$ is the number of eCCEs in ePDCCH set q. The resource index in these embodiments is derived from $n_{PUCCH,i}^{(1)}$.

Other embodiments include corresponding operations implemented by a network node, e.g., an LTE eNB, in determining the PUCCH resource used by a wireless device and receiving the HARQ feedback in that resource. Still other embodiments include wireless devices and network nodes configured to carry out one or more of the techniques detailed herein. It will be appreciated that other embodiments include variations of and extensions to these enumerated embodiments, in accordance with the detailed procedures and variants described below.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
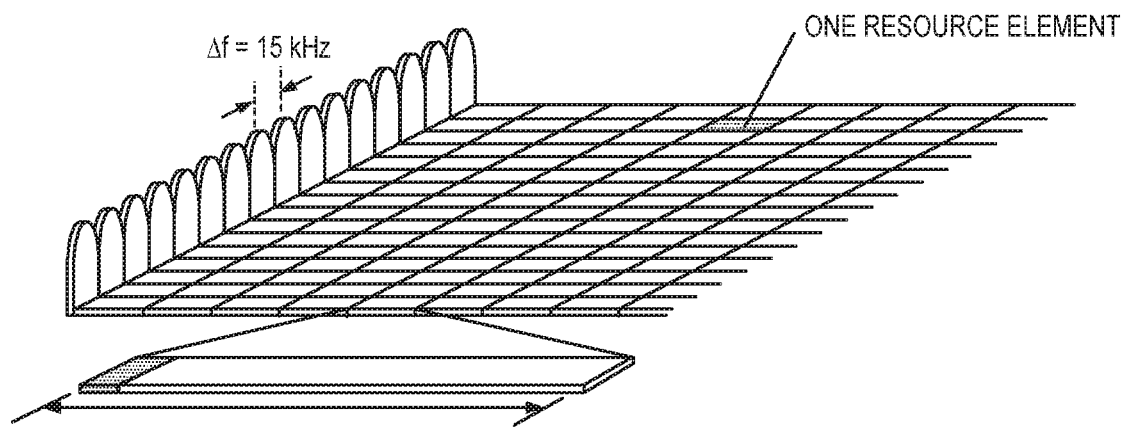
FIG. 1 is a diagram illustrating physical resources as defined in LTE.
Figure 2:
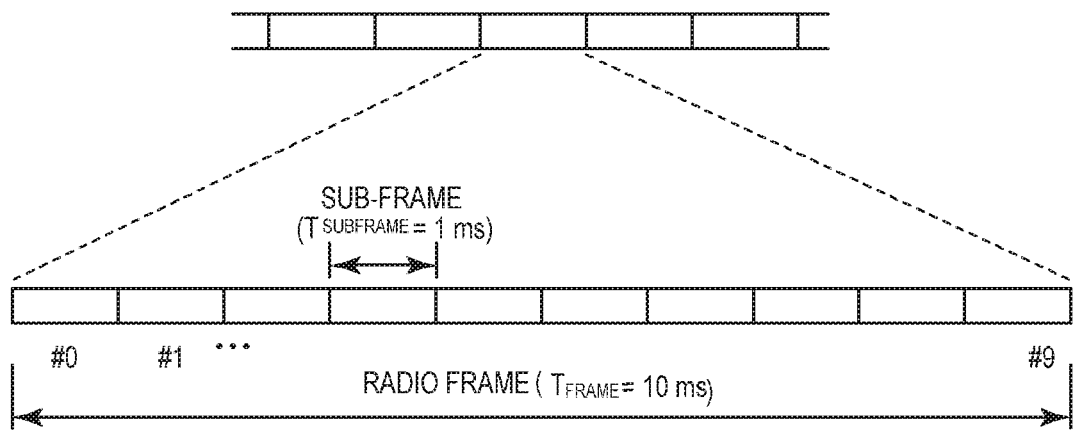
FIG. 2 is a diagram of the LTE time-domain structure.
Figure 3:
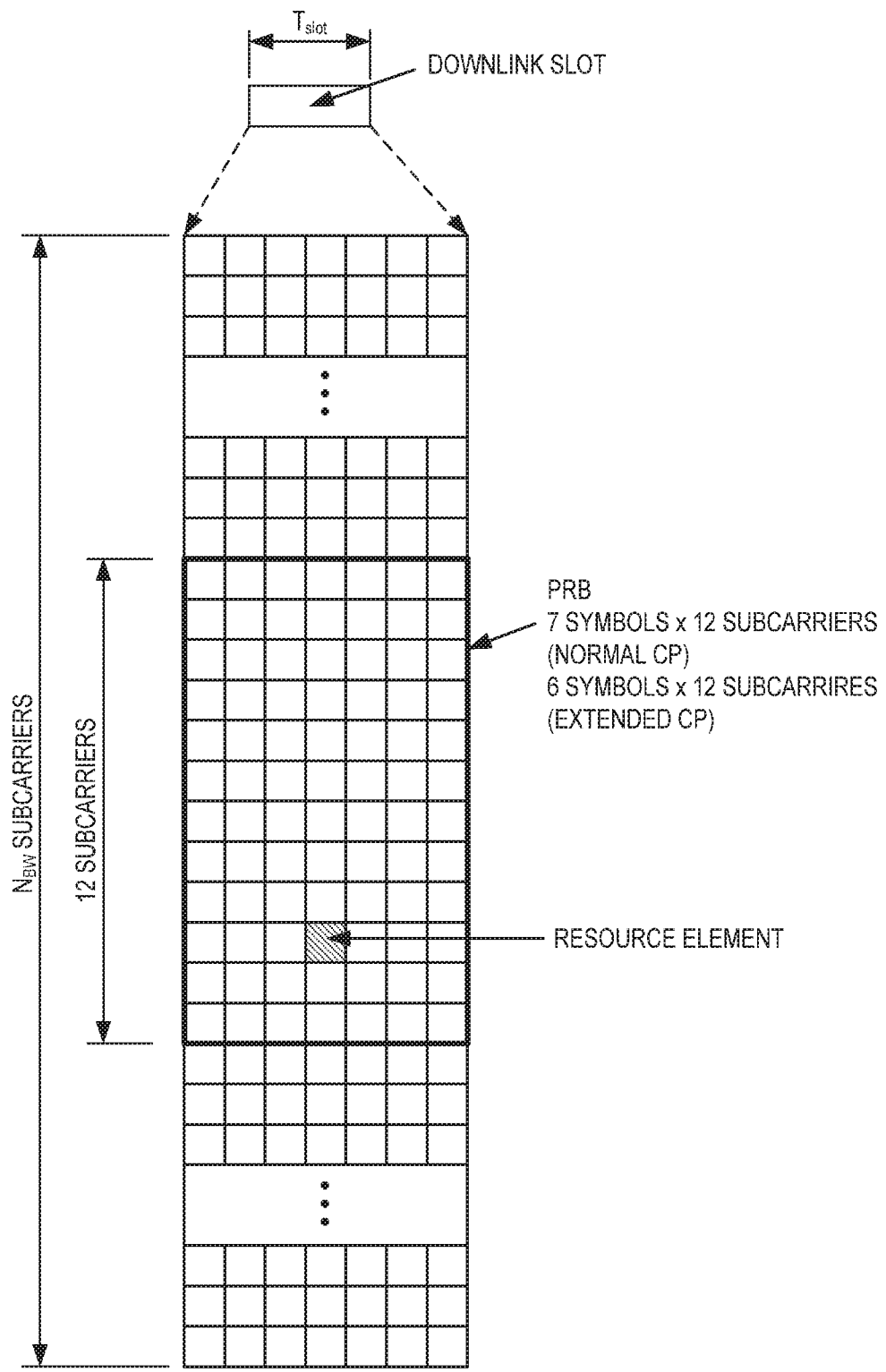
FIG. 3 is a diagram of a PRB pair within an LTE time-frequency grid.
Figure 4:
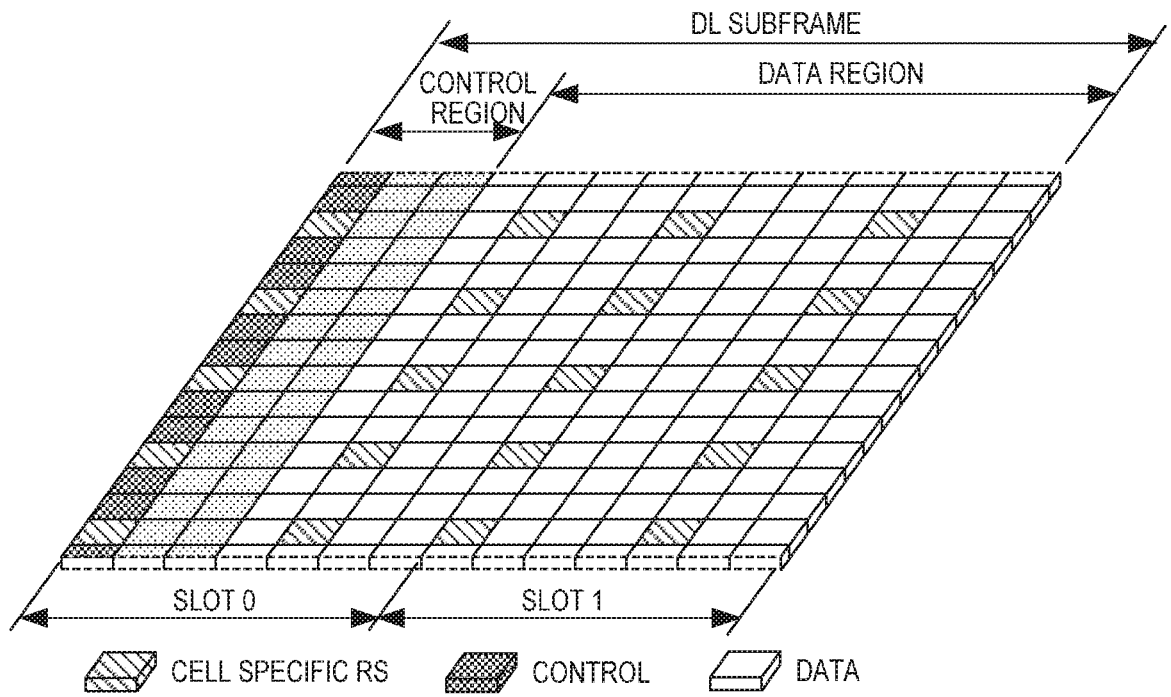
FIG. 4 is a diagram of mapping within an LTE downlink subframe for PDCCH, CRS, etc.
Figure 5:
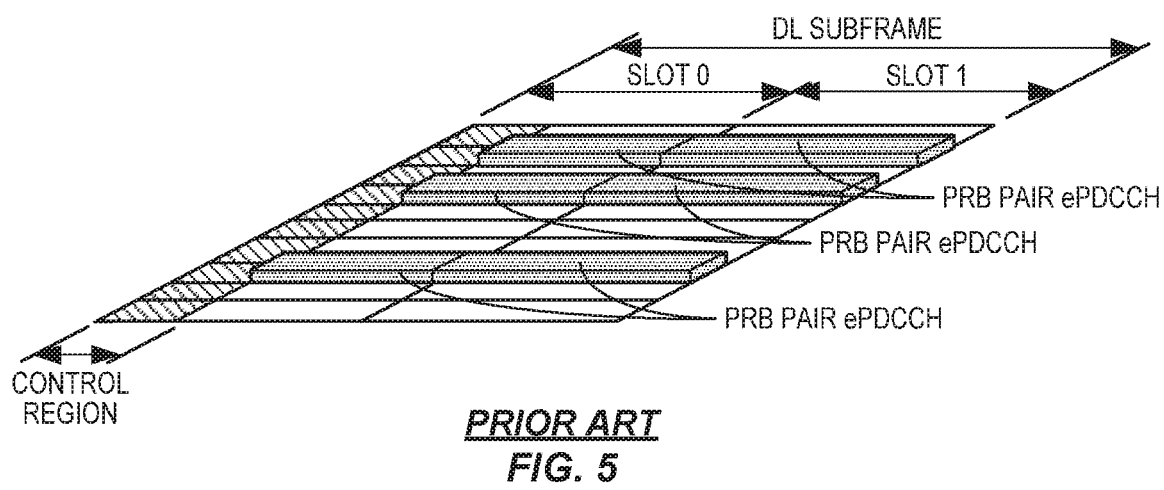
FIG. 5 is a diagram of ePDCCH, as defined in the PDSCH region of a downlink subframe.
Figures 6, 7A:
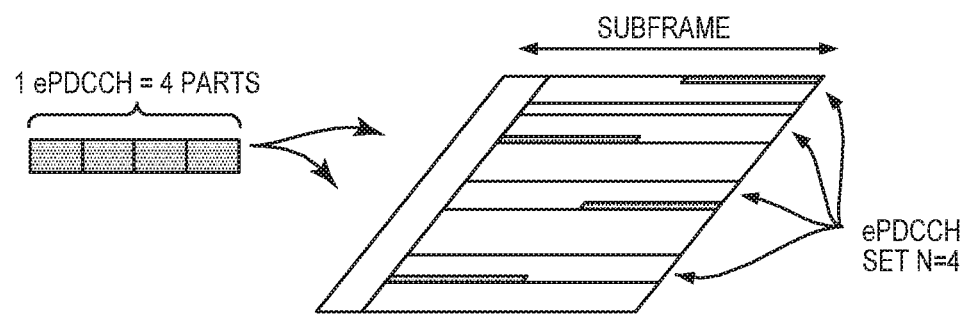
FIG. 6 is a diagram of RE/EREG mapping within a PRB pair using normal CP.
FIGS. 7A and 7B illustrate examples of distributed and localized sets of PRBs, respectively, as used for ePDCCH.
Figure 7B:
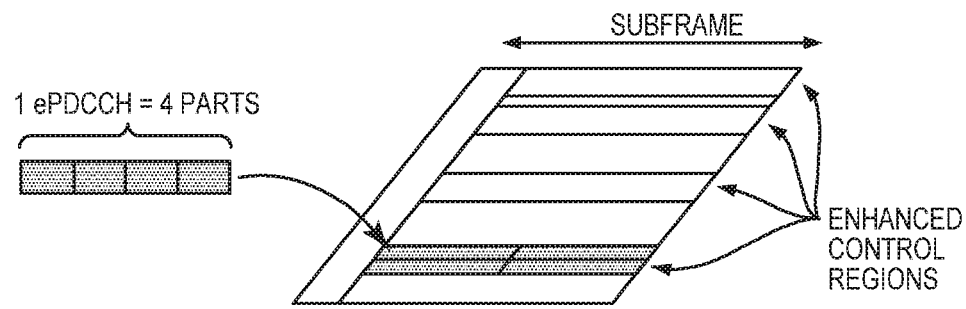
Figure 8:
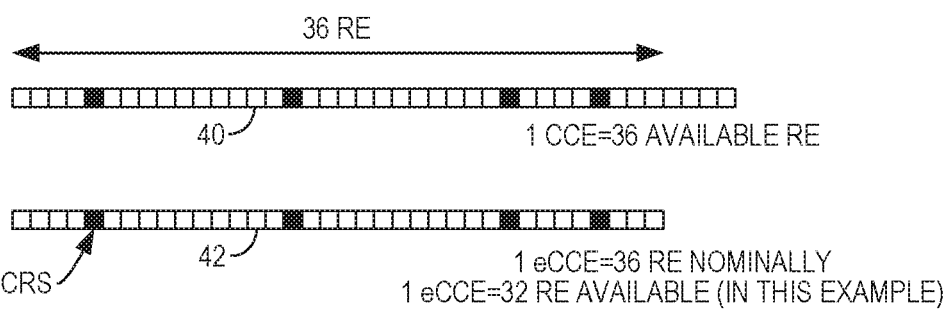
FIG. 8 illustrates a difference between a control channel element (CCE) and an enhanced CCE (eCCE) with respect to mapping around cell-specific reference signals (CRS).
Figure 9:
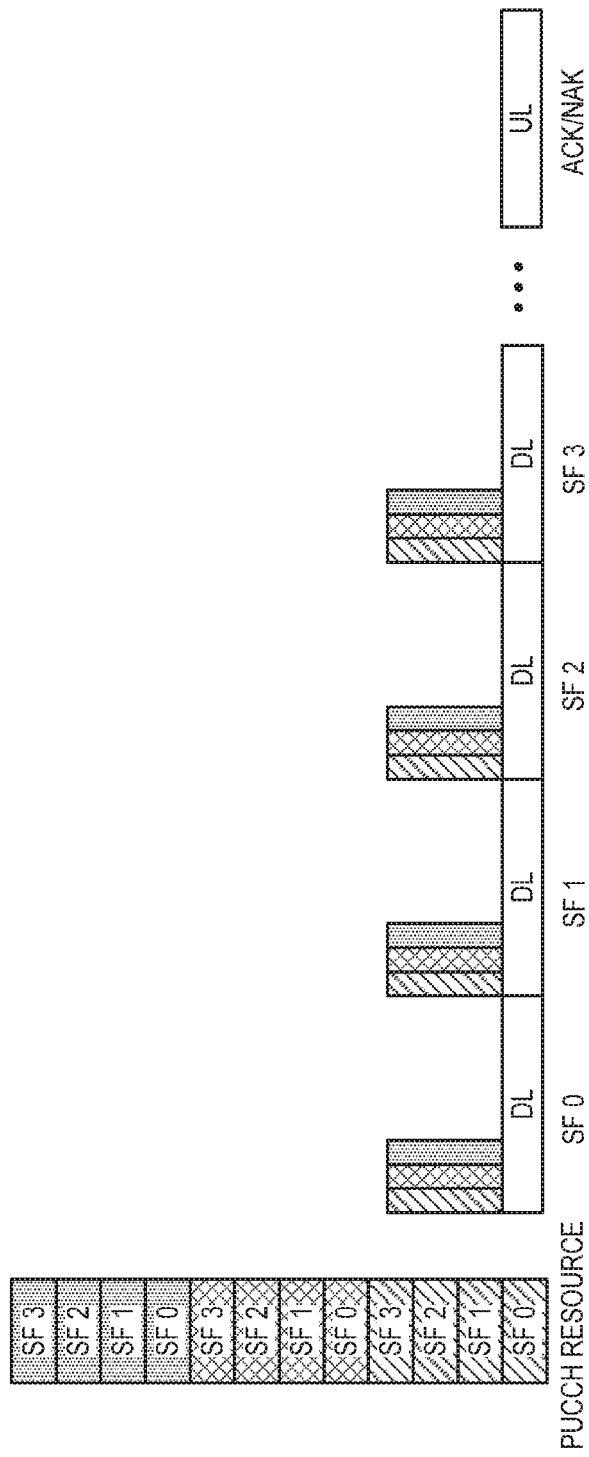
FIG. 9 illustrates the allocation of PUCCH resources for PDCCH, in TDD mode.
Figure 10:
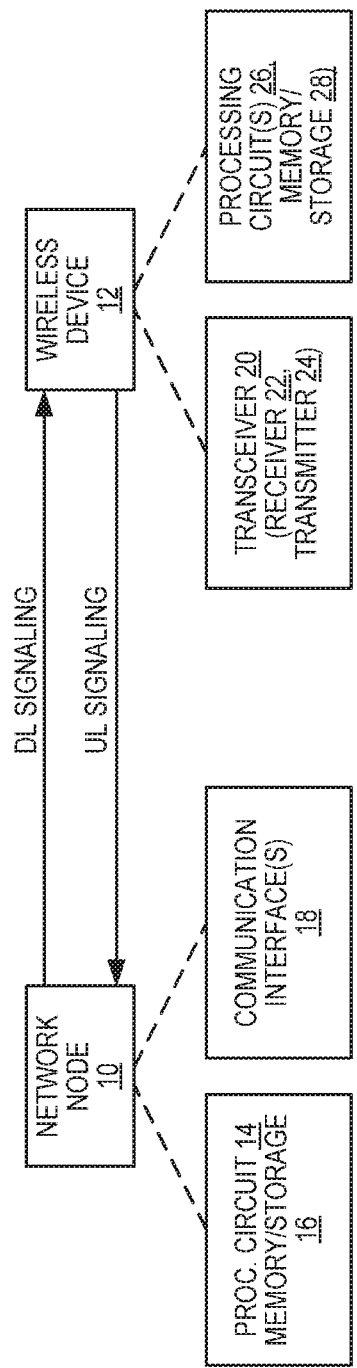
FIG. 10 is a block diagram of an example embodiment of a network node and a wireless device that are configured according to the teachings herein.

FIG. 10 illustrates a network node 10 and a wireless device 12. Wireless device 12 is configured to carry out terminal-side (i.e., UE-side) processing for the PUCCH allocation and hybrid automatic-repeat request (HARQ)-related teachings herein. In particular, the wireless device 12 is configured to determine, using one or more of several techniques detailed below, a particular Physical Uplink Control Channel (PUCCH) for hybrid automatic-repeat-request (HARQ) feedback in response to an ePDCCH-scheduled PDSCH transmission or an ePDCCH-indicated SPS release, in TDD systems. Correspondingly, the network node 10 is configured to carry out complementary network-side processing for determining the PUCCH resource used by a wireless device 12 for HARQ feedback.

The network node 10 includes one or more processing circuits 14 and associated memory/storage 16. The memory/storage 16 may be one or more types of computer-readable medium, such as a mix of volatile, working memory and non-volatile configuration and program memory or storage. The network node 10 further includes one or more communication interfaces 18. The communication interface(s) 18 depend on the nature of the network node 10. In a base station or other radio node example, the communication interface(s) 18 include a radio transceiver—e.g., pools of radio transmission, reception, and processing circuitry—for communicating with any number of wireless devices 12 in any one or more cells of a wireless communication network. Further, the network node 10 may support Carrier Aggregation (CA) operation, Time Division Duplex (TDD) operation, Multiple-Input-Multiple-Output (MIMO) operation, etc. Additionally, the communication interface(s) 18 may include inter-base-station interfaces and/or backhaul or other CN communication interfaces. In an LTE-based example where the network node 10 comprises an eNodeB, the communication interface(s) 18 include an "X2" interface for inter-eNodeB communications.

Correspondingly, the wireless device 12 may be a cellular radiotelephone—smartphone, feature phone, tablet, etc.—or may be a network adaptor, card, modem or other such interface device, or may be a laptop computer or other such device with integrated wireless communication capabilities. Of course, these examples are non-limiting and the wireless device 12 should be broadly understood as a communications transceiver configured for network operation according to the teachings herein. Further, it should be appreciated that references herein to "user equipment" or "UE" should be understood to refer more generally to a wireless device as pictured in FIG. 10.

The wireless device 12 includes a transceiver circuit 20, which includes a receiver 22 and a transmitter 24, which are cellular radio circuits, for example. The illustrated wireless device 12 further includes one or more processing circuits 26, which include or are associated with one or more memory/storage devices or circuits 28. The memory/storage 28 includes, for example, one or more types of computer-readable medium. Example media include a mix of volatile, working memory and non-volatile configuration and program memory or other storage—e.g., Random Access Memory (RAM), Read-Only Memory (ROM), Electrically-Eraseable Programmable Read-Only Memory (EEPROM), Flash memory, and the like.

Those of ordinary skill in the art will appreciate that the transmitter 24 and/or receiver 22 each may comprise a mix of analog and digital circuits. For example, the receiver 22 in one or more embodiments comprises a receiver front-end circuit, which is not explicitly shown in FIG. 10. Such circuitry generates one or more streams of digital signal samples corresponding to antenna-received signal(s) and receiver processing circuits—e.g., baseband digital processing circuitry and associated buffer memory—operate on the digital samples. Example operations include linearization or other channel compensation, possibly with interference suppression, and symbol demodulation and decoding, for recovering transmitted information.

Those of ordinary skill in the art will appreciate that FIG. 10 illustrates high-level physical circuit arrangements and that the network node 10 and the wireless device 12 generally will include digital processing circuits and associated memory or other computer-readable medium, for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions. The functional circuits realized in this manner shall be understood as "machines" specially adapted for the purpose(s) described herein. The processing circuit 14 in the network node 10 and the processing circuit 26 in the wireless device 12 may be at least partly configured in this manner.

Figure 11:
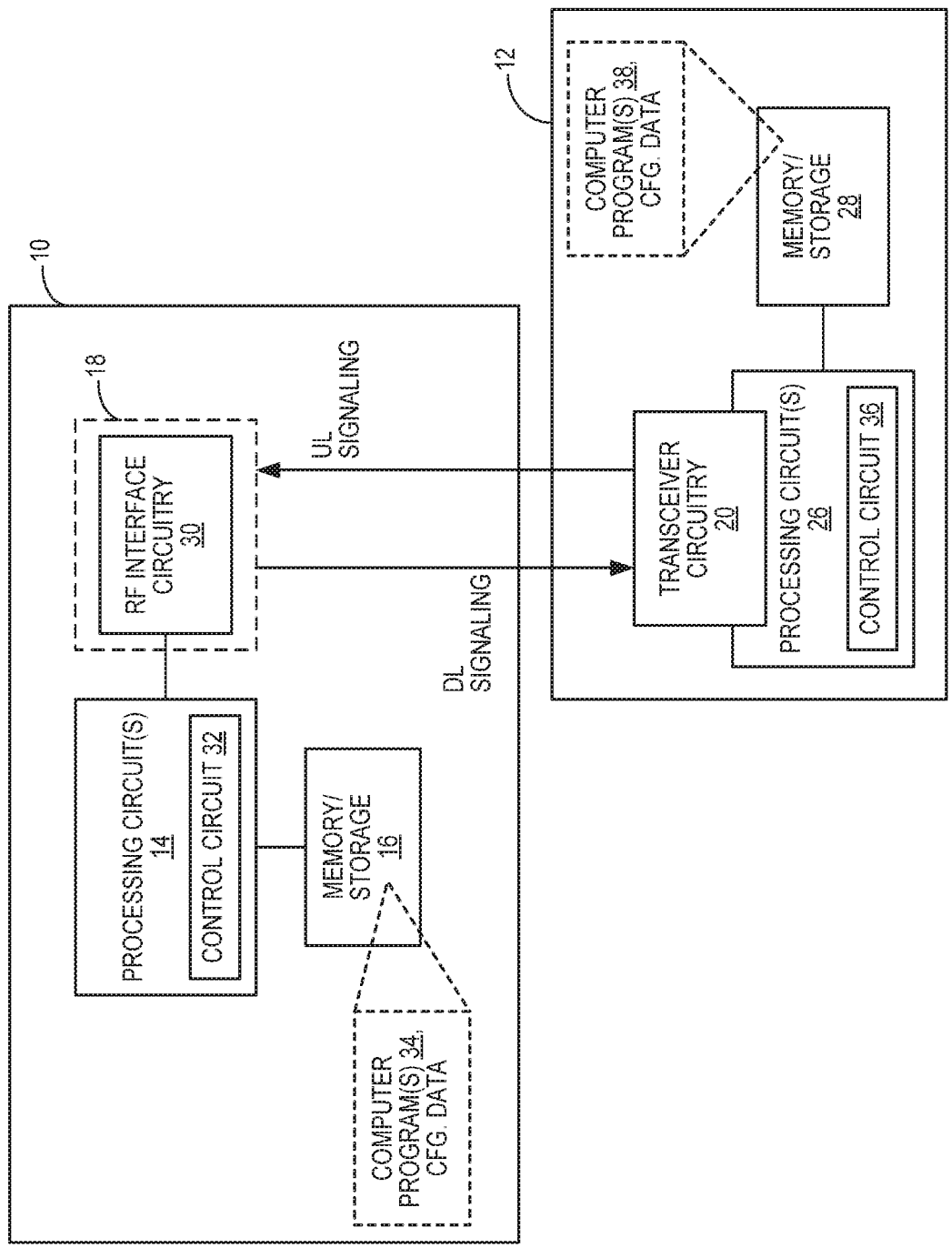
FIG. 11 is a block diagram of example details for the network node and wireless device of FIG. 10.

FIG. 11 provides example details for both the network node 10 and the wireless device 12 where the network node 10 is an eNodeB configured for operation in an LTE network, or is another type of base station or radio node. Consequently, the network node 10 in such embodiments includes RF interface circuitry 30, which represents or is included in the communication interface(s) 18 introduced in FIG. 10. Further, the processing circuit 14, which may comprise one or more microprocessors, DSPs, or other digital processing circuitry, includes a control circuit 32 that is configured according to the teachings herein. The control circuit 32 also may be referred to as a processing circuit, a processing unit, or a control unit. In at least one embodiment, the control circuit 32 is specially adapted according to the network-side teachings herein, based on its execution of stored computer program instructions from a computer program 34 stored in the memory/storage 16.

The network node 10 may comprise a rack or cabinet of processing circuits using a card/backplane arrangement and may include a host of additional processing circuits/functions not shown in the simplified diagram. More generally, the processing circuit 14 may comprise any one or more computer-based circuits that control at least communication-related processing—e.g., transmit and receive operations through the RF interface circuitry 30. Thus, the processing circuit 14 may include a number of other functional circuits not shown, such as user-scheduling circuits to control uplink and/or downlink transmissions among a plurality of wireless devices 12 being supported by the network node 10, and may include one or more conditions-determination circuits, such as for determining network loading, e.g., for one or more served cells and/or one or more neighboring cells.

In a similar fashion, the wireless device 12 may be configured to operate according to any one or more wireless communication standards, such as the WCDMA and/or LTE and LTE-A standards. Broadly, the wireless device 12 may support more than one Radio Access Technology (RAT), such as may be used in heterogeneous network deployments involving macro cells and base stations and micro cells and base stations, where macro and micro base stations may or may not use the same RAT(s). The transceiver circuitry 20 therefore may comprise one or more cellular radios, and is shown overlapping the processing circuit 26 to indicate that the receiver 22 and/or transmitter 24 may be implemented in a mix of analog and digital circuits, including baseband processing circuits comprising or otherwise included in the processing circuit 26. In one such example, the processing circuit 26 implements one or more received signal processing chains that provide, for example, received signal linearization and/or interference compensation, symbol detection and corresponding decoding (Viterbi, joint detection, etc.), for the recovery of transmitted information.

A control circuit 36 is implemented within or as part of the processing circuit 26 of the wireless device and the memory/storage 28 in some embodiments stores one or more computer programs 38 and/or configuration data. The control circuit 36 carries out device-side processing regarding PRB set expansion, as taught herein. In at least one embodiment, the control circuit 36 is implemented based on the execution of computer program instructions by the processing circuit 26, where the program instructions are stored as a computer program 38 in the storage/memory 28, for example.

It will be appreciated that references throughout the present disclosure to "one embodiment" or "an embodiment" mean that a particular feature, structure, or characteristic described in connection with an embodiment is included in at least one embodiment or aspect of the presently disclosed inventive techniques. Thus, the appearance of the phrases "in one embodiment" or "in an embodiment" in various places throughout the specification do not necessarily all refer to the same embodiment. Further, the particular features, structures or characteristics may be combined in any suitable manner in one or more embodiments.

According to several embodiments of the presently disclosed techniques, solutions are provided for PUCCH resource determination for HARQ-ACK transmission in response to ePDCCH-scheduled PDSCH or ePDCCH-indicated SPS release in a TDD radio communication system. Several different categories of embodiments are described below, which have different combinations of PUCCH blocking probability, PUCCH resource utilization efficiency, eNB scheduler complexity and implementation complexity. For convenience, these embodiments are described under headings of "Embodiment 1," "Embodiment 2," etc. However it should be appreciated by those skilled in the art that each of these categories may include several variations, that these embodiments are not necessarily mutually exclusive, and that various aspects of these embodiments can be used together.

The embodiments described below can fit into (be used in conjunction with) different FDD PUCCH HARQ-ACK resource allocation schemes for ePDCCH. To provide context for the described embodiments, the proposal for FDD PUCCH HARQ-ACK resource allocation described in a 3GPP submission numbered R1-123870 and entitled "PUCCH resource allocation for ePDCCH" for distributed ePDCCH is described below. (R1-123870 is available at http://www.3gpp.org/ftp/tsg_ran/wg1_rl1/TSGR1_70/Docs/.) However those skilled in the art will appreciate that the presently disclosed embodiments are not limited to usage with this FDD resource allocation scheme and that, in fact, these TDD resource allocation schemes can be used with other FDD resource allocation schemes.

Figure 12:
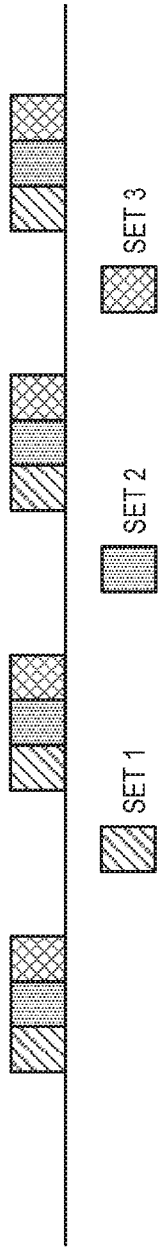
FIG. 12 depicts an exemplary ePDCCH resource configuration example having three ePDCCH sets with 4 PRBs per set.

However, for context, the PUCCH resource in FDD mode is determined by $n_{PUCCH}^{(1)} = n_{eCCE} + N_{UE-PUCCH}^{(q)}$, where $n_{eCCE}$ is the lowest eCCE index of the DCI detected on ePDCCH and $N_{UE-PUCCH}^{(q)}$ is a UE-specific offset, signaled to the UE by Radio Resource Control (RRC) signaling. It has been agreed by 3GPP that a UE can be configured with Q sets of N PRB pairs respectively, to be used for ePDCCH. Each set can have one of several different sizes, e.g., 2, 4, 8 PRB pairs. In the following, it is assumed for purposes of illustration that the UE is configured with three ePDCCH sets, and with four PRBs per set as shown in FIG. 12. Each set of PRBs is configured with a PUCCH HARQ-ACK resource starting position $N_{UE-PUCCH}^{(q)}$, q=1, ..., Q, and the PRB pairs of each set are distributed across the frequency band, as shown in FIG. 12, where diagonally-marked, shaded, and cross-hatched blocks are used to represent elements of sets 1, 2 and 3, respectively. As mentioned above, the proposed solutions described in detail below could be easily extended to any ePDCCH resource configurations and the example of FIG. 12 (which is used as a baseline reference to describe the embodiments below) can be varied, e.g., to include more or fewer ePDCCH sets and/or more or fewer PRBs per set.

Embodiment 1

According to this embodiment and variants thereof, for PDSCH transmission indicated by the detection of corresponding ePDCCH or an ePDCCH indicating downlink SPS release within subframe $n-k_i$, where $k_i$ belongs to a set of M elements $k_i \in \{k_1, k_2, \ldots k_{M-1}\}$ as defined in Table 10.1.3.1-1 of 3GPP TS 36.213, v10.6.0, the UE shall determine the PUCCH resource $n_{PUCCH,i}^{(1)}$ so that the allocated PUCCH resources for a given subframe k follows the following rule:

$$n_{PUCCH,i}^{(1)} = i \cdot N_q^{eCCE} + n_{eCCE,i} + N_{UE-PUCCH}^{(q)}, \quad (2)$$

where $n_{eCCE,i}$, which is the lowest eCCE index of the DCI detected on ePDCCH, belongs to ePDCCH set q of subframe $n-k_i$, $0 \le i \le M-1$. M is the number of elements in the set defined in Table 10.1.3.1-1, and $N_q^{eCCE}$ is the number of eCCEs in ePDCCH set q. Note that although this and the following embodiments refer to the UE determining the relevant PUCCH HARQ resources, it will be understood by those skilled in the art that both the UE and its serving base station (e.g., eNB, or another network node connected thereto) will need to determine the relevant PUCCH HARQ resources for the connection between the UE and its serving base station so that, e.g., both nodes know which resource the UE/BS is using to be able to decode the ACK/NAK correctly. Accordingly, although other embodiments described below may not explicitly restate this, it shall be understood that each embodiment can be implemented in both the UE and the network side, e.g., base station.

Figure 13:
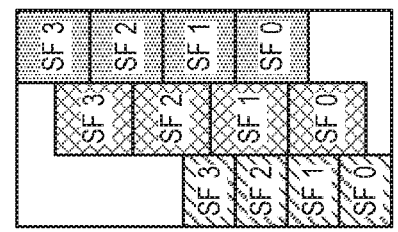
FIG. 13 illustrates an example of a PUCCH HARQ-ACK resource structure according to an embodiment.

Following equation (2) above, the PUCCH HARQ-ACK resource will be stacked across subframes for each ePDCCH set independently, as shown in FIG. 13. Thus, for each ePDDCH set, the PUCCH ACK/NAK resource is stacked across the subframes sequentially, i.e., DCI messages belonging to subframe 0 first, followed by DCIs belonging to subframe 1 . . . etc. Therein, each of the columns are associated with a different ePDCCH set (yellow(Y), blue(B) and red(R)) as indicated. An advantage of this alternative is simplicity and the resource utilization will be effective at low system load if the scheduler could always allocate DCI to the ePDCCH Set 1 with high priority. However, this solution increases the PUCCH HARQ-ACK blocking probability since it introduces additional PUCCH resource blocking among different subframes. This also makes the eNB scheduler more complicated.

Note that equation (2) assumes that there are an equal number of eCCEs per each subframe in the first i subframes of the M downlink subframes that are associated with uplink subframe n. This may not always be the case, in which case equation (2) may not always apply. However, the sequential stacking of PUCCH HARQ-ACK resources, where resources for each of the Q ePDCCH set are stacked independently, as shown in FIG. 13, may still be applied in cases where there is an unequal number of eCCEs across the subframes. The same advantages described above apply.

In an extension to the formula in equation (2), the PUCCH resources are compressed between the different sets q together with a varying M for the HARQ-ACK feedback in the uplink. In an embodiment, an HARQ-ACK compression scheme is introduced that compresses the HARQ-ACK PUCCH resources based on M. In a further example the compression scheme works by compressing the HARQ-ACK PUCCH resources between different sets q together. An example of such a compression scheme is shown here by using eq. (2) as a base, resulting in equation (2a) below. However it is also possible to extend the other embodiments described below in a similar manner.

$$n_{PUCCH,i}^{(1)} = i \cdot N_q^{eCCE} + n_{eCCE,i} + N_{UE-PUCCH}^{(q)} - \sum_{q'=0}^{q-1}(M_{max} - M) \cdot N_{q'}^{eCCE} \quad (2a)$$

where the definitions for equation 2a are the same as in equation 2, with the addition that $N_{-1}^{eCCE}=0$ and $M_{max}$ is the maximum M over all possible HARQ-ACK feedback subframes for a given UL/DL configuration, as set forth according to table 10.1.3.1-1 in 3GPP TS 36.213. v10.6.0. For example, $M_{max}$ can be 3 in the event that UL/DL configuration 3 is used.

Embodiment 2

Figure 14:
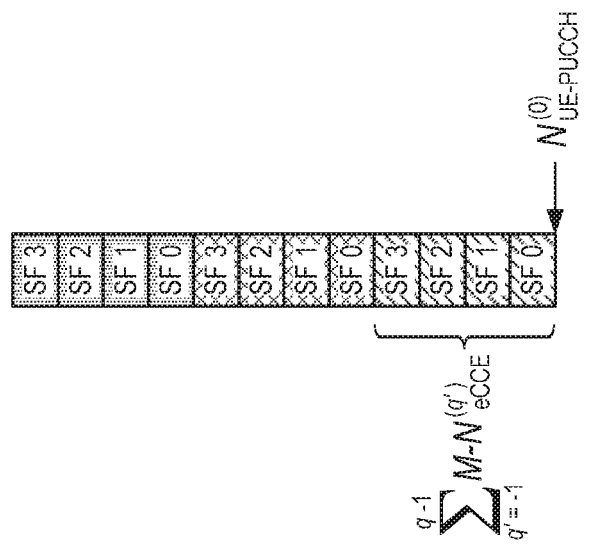
FIG. 14 illustrates an example of a PUCCH HARQ-ACK resource structure according to another embodiment.

According to this embodiment and variants thereof, for PDSCH transmission indicated by the detection of corresponding ePDCCH or an ePDCCH indicating downlink SPS release within subframe $n-k_i$, where $k_i$ belongs to a set of M elements $k_i \in \{k_1, k_2, \ldots k_{M-1}\}$ as defined in Table 10.1.3.1-1 in 3GPP TS 36.213, v10.6.0, the UE shall determine the PUCCH resource $n_{PUCCH,i,k}^{(1)}$ according to this embodiment as follows:

$$n_{PUCCH,i,q}^{(1)} = n_{eCCE,i} + N_{UE-PUCCH}^{(0)} + i \cdot N_{eCCE}^{(q)} + \sum_{q'=-1}^{q-1} M \cdot N_{eCCE}^{(q')} \quad (3)$$

where $n_{eCCE,i,k}$ belongs to ePDCCH set q of subframe $n-k_i$, $0 \leq i \leq M-1$; M is the number of elements in the set defined in Table 10.1.3.1-1 in 3GPP TS 36.213, v10.6.0; $N_{UE-PUCCH}^{(0)}$ is a UE-specific offset parameter for the set with the lowest PUCCH resource starting position and $N_{eCCE}^{(q')}$ is the total amount of CCE in an set q' per subframe with $N_{eCCE}^{(-1)}=0$. Following equation (3) above, the PUCCH HARQ-ACK resource will be stacked across subframes after each other per set q as shown in FIG. 14. Thus, the PUCCH ACK/NAK resources according to this embodiment are stacked for each ePDCCH set, one by one. Starting from the set with the lowest PUCCH ACK/NAK starting position, the PUCCH ACK/NAK resources are stacked across the subframes sequentially, i.e., DCI messages belonging to subframe 0 first followed by DCIs belonging to subframe 1, etc. The set with second lowest PUCCH ACK/NAK starting position will be stacked beginning at the end of region for the first set, then the set with the third lowest PUCCH ACK/NAK starting position, etc. In FIG. 14, each of the different ePDCCH sets is indicated by diagonally-marked, shaded, and cross-hatched blocks. An advantage with this embodiment is that a single parameter $N_{UE-PUCCH}^{(0)}$ is able to provide unique PUCCH resources for all of the different sets at the same time. Thus, there will be no resource collisions among different sets, as well as no resource collisions between subframes.

Embodiment 3

Figure 15:
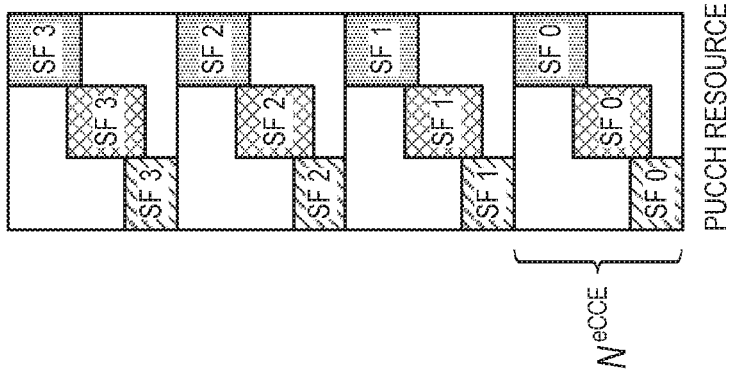
FIG. 15 illustrates an example of a PUCCH HARQ-ACK resource structure according to another embodiment.

In this third embodiment and variants thereof, the PUCCH resources from the corresponding ePDCCH are stacked first within one subframe for all sets. This is quite distinct from embodiment 2, where the PUCCH resources are stacked per all subframes within a set. Thus, for PDSCH transmission indicated by the detection of corresponding ePDCCH or an ePDCCH indicating downlink SPS release within subframe $n-k_i$, where $k_i$ belongs to a set of M elements $k_i \in \{k_1, k_2, \ldots k_{M-1}\}$ as defined in Table 10.1.3.1-1 in 3GPP TS 36.213, v10.6.0, the UE shall determine the PUCCH resource $n_{PUCCH,i}^{(1)}$ for this third embodiment as follows:

$$n_{PUCCH,i}^{(1)} = i \cdot N_{PUCCH}^{ePDCCH} + n_{eCCE,i} + N_{UE-PUCCH}^{(k)} \quad (4)$$

where $n_{eCCE,i}$ belongs to ePDCCH set q of subframe $n-k_i$, $0 \leq i \leq M-1$; M is the number of elements in the set defined in Table 10.1.3.1-1 of 3GPP TS 36.213, v. 10.6.0; and $N_{PUCCH}^{ePDCCH}$ is the total number of PUCCH resources in all sets within one subframe. Following equation (4) above, the PUCCH HARQ-ACK resource in different subframes will not be overlapped as shown in the example of FIG. 15, again with diagonally-marked blocks indicating subframes belonging to a first set, shaded blocks indicating subframes belonging to a second set and cross-hatched blocks indicating subframes belonging to a third set. Thus, according to this embodiment, the PUCCH ACK/NAK resources are stacked for each subframe sequentially. Starting from subframe 0, the PUCCH ACK/NAK resources are stacked separately for each set. Note that the size of the resource region within one subframe depends on the size of each ePDCCH set and the PUCCH starting position of each set. The PUCCH ACK/NAK resource for subframe 1 starts from the end of resource region for subframe 0 in the same manner, then subframe 2 is after subframe 1, etc. $N_{PUCCH}^{ePDCCH}$ can for example, either be calculated by the UE based on all configured sets or signaled from the eNodeB. This solution also has low complexity. Compared to the first embodiment, there will be no resource collisions among different subframes but the resource utilization is relatively low, since the resources are reserved even when there is no user scheduled within a particular subframe.

Embodiment 4

According to this fourth embodiment and variants thereof, for PDSCH transmission indicated by the detection of corresponding ePDCCH or an ePDCCH indicating downlink SPS release within subframe n–$k_i$, where $k_i$ belongs to a set of M elements $k_i \in \{c\ k_1, k_2, \ldots k_{M-1}\}$ as defined in Table 10.1.3.1-1 in 3GPP TS 36.213, v10.6.0, the UE shall determine the PUCCH resource $n_{PUCCH,i}^{(1)}$ according to this embodiment as follows:

$$n_{PUCCH,i}^{(1)} = n_{eCCE,i} + N_{UE\text{-}PUCCH}^{(i,q)} \qquad (5)$$

where $n_{eCCE,i}$ belongs to ePDCCH set k of subframe n–$k_i$, 0≤i≤M–1. M is the number of elements in the set defined in Table 10.1.3.1-1, and $N_{UE\text{-}PUCCH}^{(i,q)}$ is the UE-specific PUCCH resource start position for ePDCCH set q for index i. This solution provides full flexibility to configure PUCCH HARQ-ACK regions for each subframe. On one hand, this gives the eNB full freedom to manage PUCCH HARQ-ACK resources. This embodiment can provide orthogonal resources for all sets in a cell, even if some UEs are only configured with a subset of them. The drawback of this embodiment is the additional signaling needed.

Figure 16:
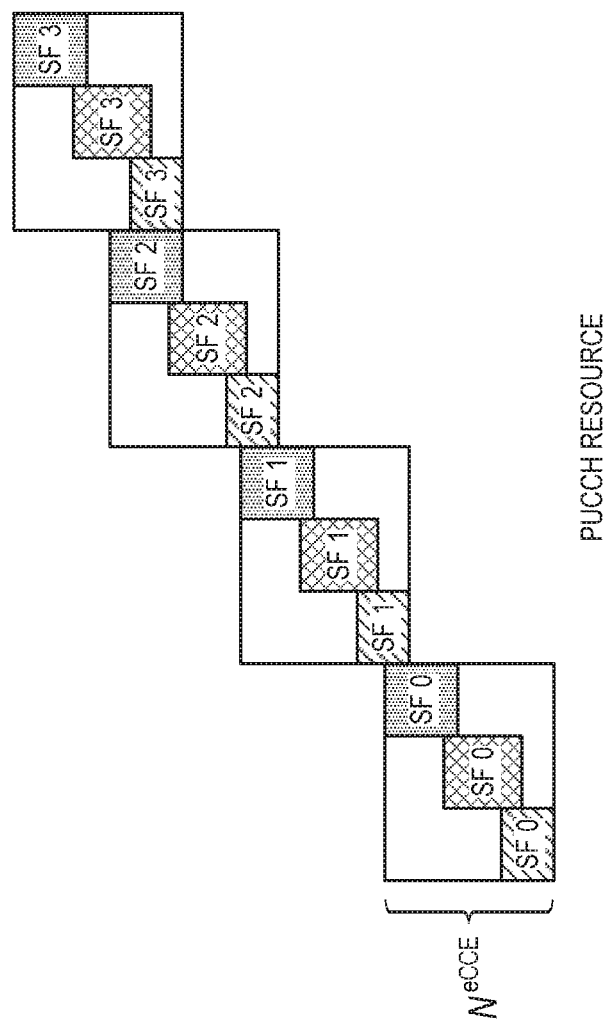
FIG. 16 illustrates an example of a PUCCH HARQ-ACK resource structure according to another embodiment.

One example of the PUCCH resource configuration according to this embodiment is illustrated in FIG. 16, again with diagonally-marked blocks indicating subframes belonging to a first set, shaded blocks indicating subframes belonging to a second set and cross-hatched blocks indicating subframes belonging to a third set. From FIG. 16 it can be seen that, according to this embodiment, the PUCCH ACK/NAK resources for each subframe and each set are stacked completely independently from each other.

As a variant of this fourth embodiment, for PDSCH transmission indicated by the detection of corresponding ePDCCH or an ePDCCH indicating downlink SPS release within subframe n–$k_i$, where $k_i$ belongs to a set of M elements $k_i \in \{k_1, k_2, \ldots k_{M-1}\}$ as defined in Table 10.1.3.1-1 in 3GPP TS 36.213, v10.6.0, the UE shall determine the PUCCH resource $n_{PUCCH,i}^{(1)}$ according to this embodiment as follows:

$$n_{PUCCH,i}^{(1)} = n_{eCCE,i} + i \cdot N_{UE\text{-}PUCCH\text{-}OFFSET}^{(q)} + N_{UE\text{-}PUCCH}^{(q)} \qquad (6)$$

where $n_{eCCE,i}$ belongs to ePDCCH set k of subframe n–$k_i$, 0≤i≤M–1; M is the number of elements in the set defined in Table 10.1.3.1-1; $N_{UE\text{-}PUCCH}^{(q)}$ is the UE-specific PUCCH resource start position for ePDCCH set q; and $N_{UE\text{-}PUCCH\text{-}OFFSET}^{(q)}$ is the UE-specific offset value for set q. This embodiment has less flexibility than embodiment 3, but with lower signaling overhead. This embodiment can provide orthogonal resources for all sets in a cell even if some UEs are only configured with a subset of them. If $N_{UE\text{-}PUCCH\text{-}OFFSET}^{(q)}$ is the same for all sets, then this becomes the same as embodiment 2, with a configured $N_{PUCCH}^{ePDCCH}$.

Fifth Embodiment

According to this fifth embodiment and variants thereof, for PDSCH transmission indicated by the detection of corresponding ePDCCH or an ePDCCH indicating downlink SPS release within subframe n–$k_i$, where $k_i$ belongs to a set of M elements $k_i \in \{k_1, k_2, \ldots k_{M-1}\}$ as defined in Table 10.1.3.1-1 in 3GPP TS 36.213, v10.6.0, the UE shall determine the PUCCH resource $n_{PUCCH,i}^{(1)}$ as follows:

$$n_{PUCCH,i}^{(1)} = (M - m - 1) \cdot \sum_{j=0, j \in V_C}^{c} (N_C^{eCCE}(j) - N_C^{eCCE}(j-1)) + \qquad (7)$$

$$m \cdot \sum_{j=0, j \in V_C}^{c} (N_C^{eCCE}(j+1) - N_C^{eCCE}(j)) + n_{eCCE,i} + N_{UE\text{-}PUCCH}^{(q)}$$

where $n_{eCCE,i}$ belongs to ePDCCH set q of subframe n–$k_i$, 0≤i≤M–1; and M is the number of elements in the set defined in Table 10.1.3.1-1. In this embodiment, the UE first selects a c out of $\{0, 1, 2, \ldots, 2Q\}$, where the selected c makes $N_C^{eCCE}(c) \leq (n_{eCCE,i} + N_{UE\text{-}PUCCH}^{(k)}) < N_C^{eCCE}(c+1)$, where $N_C^{eCCE} = \text{sort}(N_{UE\text{-}PUCCH}^{(0)}, N_{UE\text{-}PUCCH}^{(0)} + N_0^{eCCE}, \ldots, N_{UE\text{-}PUCCH}^{(Q)}, N_{UE\text{-}PUCCH}^{(Q)} + N_Q^{eCCE})$, the function sort(•) is with increasing order, $N_C^{eCCE}(-1) = N_C^{eCCE}(0)$, $V_c$ is a set of c which satisfies the following condition $$V_c = \left\{ c \,\middle|\, [N_C^{eCCE}(c), N_C^{eCCe}(c+1)] \in \bigcup_k ([N_{UE\text{-}PUCCH}^{(q)}, N_{UE\text{-}PUCCH}^{(q)} + N_q^{eCCE}]) \right\}.$$

Figure 17:
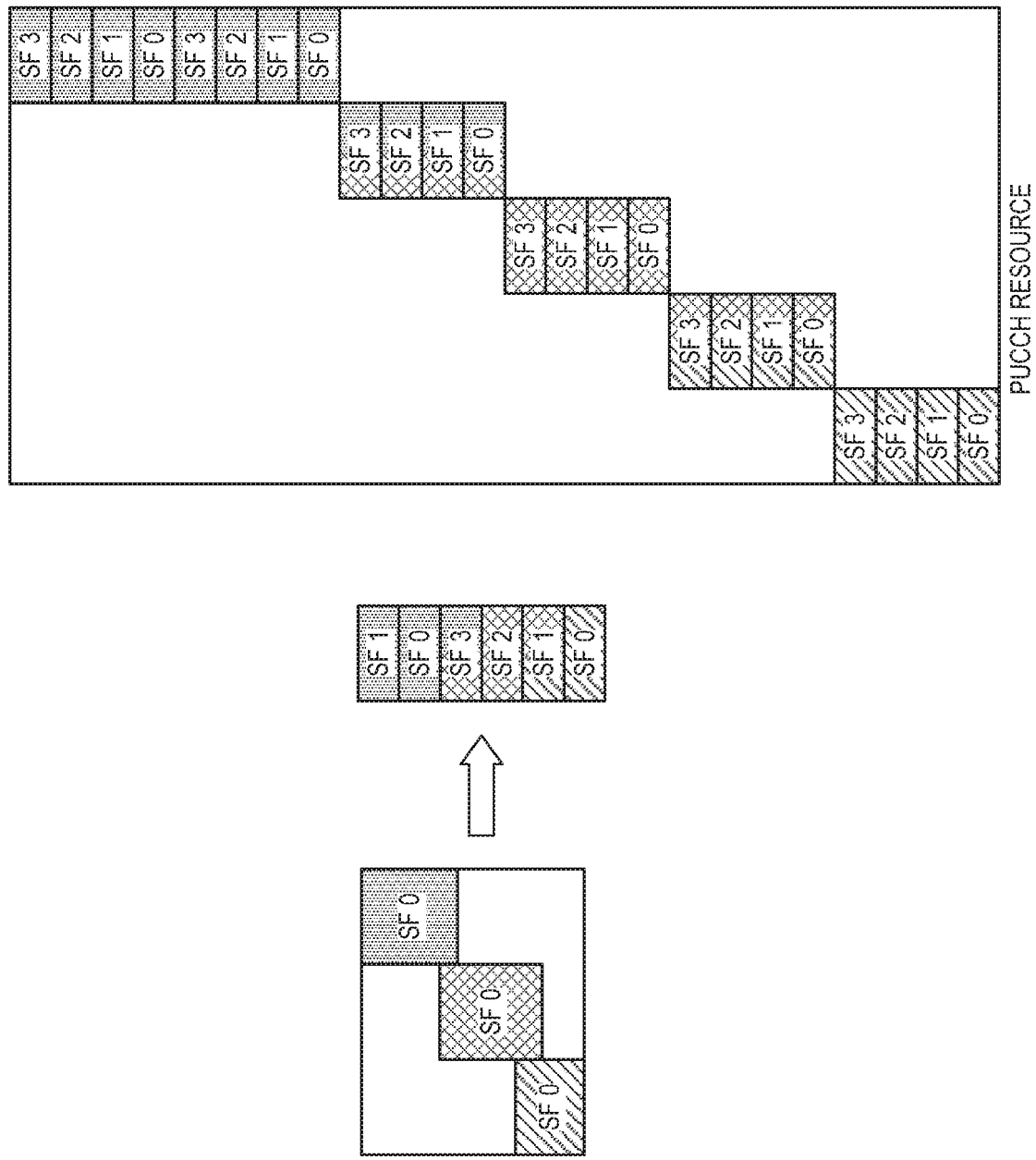
FIG. 17 illustrates an example of a PUCCH HARQ-ACK resource structure according to another embodiment.

This solution has relatively high complexity but has the advantage of high resource utilization efficiency. One example of the PUCCH resource configuration according to this embodiment is illustrated in FIG. 17. Thus, according to this embodiment, based on the PUCCH ACK/NAK resources starting position and the size of resource region for each ePDCCH set, the whole PUCCH ACK/NAK region is first divided into multiple non-overlapping subregions in an increasing order. For example, starting from the first subregion, the PUCCH ACK/NAK resources are stacked across subframes, i.e., DCI messages belonging to (subframe 0, subregion 0) followed by DCIs belonging to (subframe 1, subregion 0), then DCsI belonging to (subframe 2, subregion 0), etc. Then for the second subregion, the PUCCH ACK/NAK resources are stacked in the same manner from the end of first subregion. The same principles are then applied for the rest of the subregions.

Embodiments 6-10

As an additional variation of any of the previously described embodiments 1-5, an additional correction term can be added to the resource calculation. This term relates to the size of the legacy PDCCH region. Such alternative embodiments result in the PUCCH resource that is used being scaled by the size of the PDCCH region in all the subframes that are part of the HARQ-ACK window. It is further possible to foresee that the number of PDCCH resources may be approximately derived and not be exactly the number that is derived.

This modification is exemplified in equation (8) below, using embodiment 1, but the same modification can be applied to any embodiment described herein. With this extension the UE shall determine the PUCCH resource $n_{PUCCH,i}^{(1)}$ as follows:

$$n_{PUCCH,i}^{(1)} = i \cdot N_q^{eCCE} + n_{eCCE,i} + N_{UE-PUCCH}^{(q)} + (M-1) * N^{CCE}, \qquad (8)$$

where $N^{CCE}$ is the maximum number of CCEs available on the legacy PDCCH in a subframe. In a more general formulation the UE shall determine the PUCCH resource $n_{PUCCH,i}^{(1)}$ as follows:

$$n_{PUCCH,i}^{(1)} = i \cdot N_k^{eCCE} + n_{eCCE,i} + N_{UE-PUCCH}^{(k)} + \sum_{j=1}^{M-1} N_j^{CCE}, \qquad (9)$$

where $N_j^{CCE}$ is the largest number of available CCEs on the legacy PDCCH in subframe $n-k_j$. In other embodiments the sum may instead go from j=0.

Among other things, the foregoing embodiments provide several solutions for PUCCH resource determination for HARQ-ACK transmission in response to ePDCCH-scheduled PDSCH or ePDCCH-indicated SPS release in a TDD system. These embodiments offer different alternatives with tradeoffs among, for example, PUCCH blocking probability, PUCCH resource utilization efficiency, eNB scheduler complexity and implementation complexity.

From the foregoing discussion of various exemplary embodiments, it will be appreciated that these and other embodiments will, when implemented, have impacts on various nodes in a radio communication system. For example, the various PUCCH resource determination schemes for HARQ-ACK transmission in response to ePDCCH-scheduled PDSCH or ePDCCH-indicated SPS release in a TDD system described above may need to be implemented at both a network side node (e.g., eNB) and at the user equipment.

Figure 18:
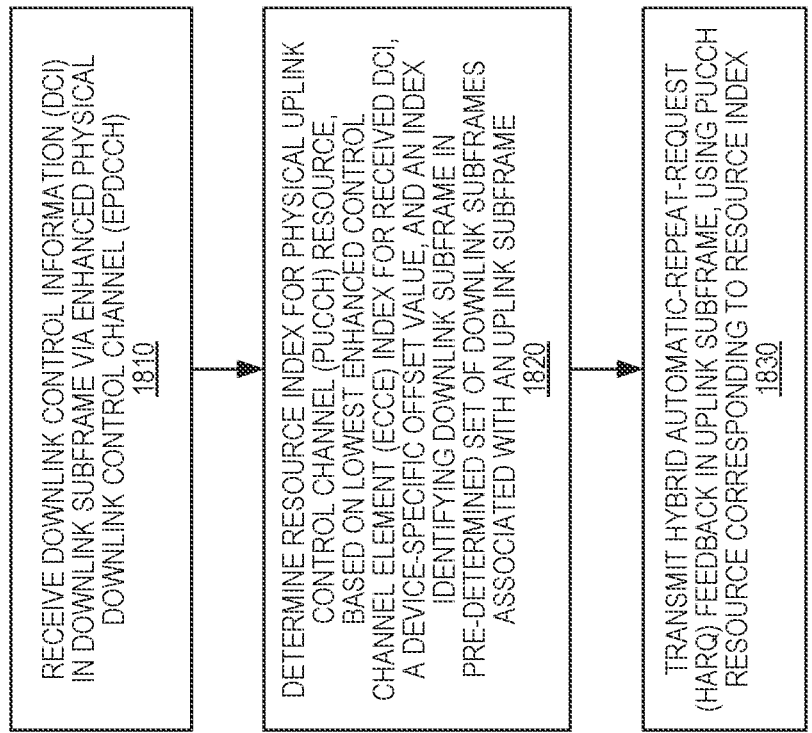
FIG. 18 is a logic flow diagram of one embodiment of a method of processing at a wireless device.

FIG. 18 illustrates a non-limiting example embodiment of a processing method 1800, which corresponds to the above-described processing for the wireless device 12, for at least embodiment 1. The method 1800 is directed to a technique for determining the resources for transmitting hybrid automatic-repeat-request (HARD) feedback in a wireless communication network configured for time-division duplexing (TDD) operation. The method begins, as shown at block 1810, with receiving downlink control information (DCI) via an Enhanced Physical Downlink Control Channel (ePDCCH) in a downlink subframe. The received ePDCCH schedules a downlink shared channel transmission to the wireless device or indicates a release of semi-persistent scheduling (SPS) to the wireless device.

As shown at block 1820, the method continues with determining a resource index for a Physical Uplink Control Channel (PUCCH) resource based on the lowest enhanced Control Channel Element (eCCE) index of the received DCI, a device-specific offset value previously signaled to the wireless device via Radio Resource Control (RRC) signaling, and an index i. The index i identifies the downlink subframe in a pre-determined set of one or more downlink subframes associated with an uplink subframe. The determining of the PUCCH resource is performed according to a formula that results in a sequential allocation of PUCCH resources in the uplink subframe with respect to the downlink subframes associated with the uplink subframe, for each of a plurality of sets of ePDCCH resources. As shown at block 1830, the method continues with the transmitting of HARQ feedback in the uplink subframe, using a PUCCH resource that corresponds to the resource index.

In some embodiments, such as those described above under the heading "Embodiment 1," determining the resource index for the PUCCH resource comprises determining the resource index based on the sum of (i) the lowest enhanced eCCE of the received DCI, (ii) the device-specific offset value previously signaled to the wireless device via RRC signaling, and (iii) the product of the index i and the number of eCCEs in a set of ePDCCH resources that includes those ePDCCH resources used by the received ePDCCH. In some of these embodiments, determining the resource index comprises calculating the resource index according to equation (2), as set forth above.

Figure 19:
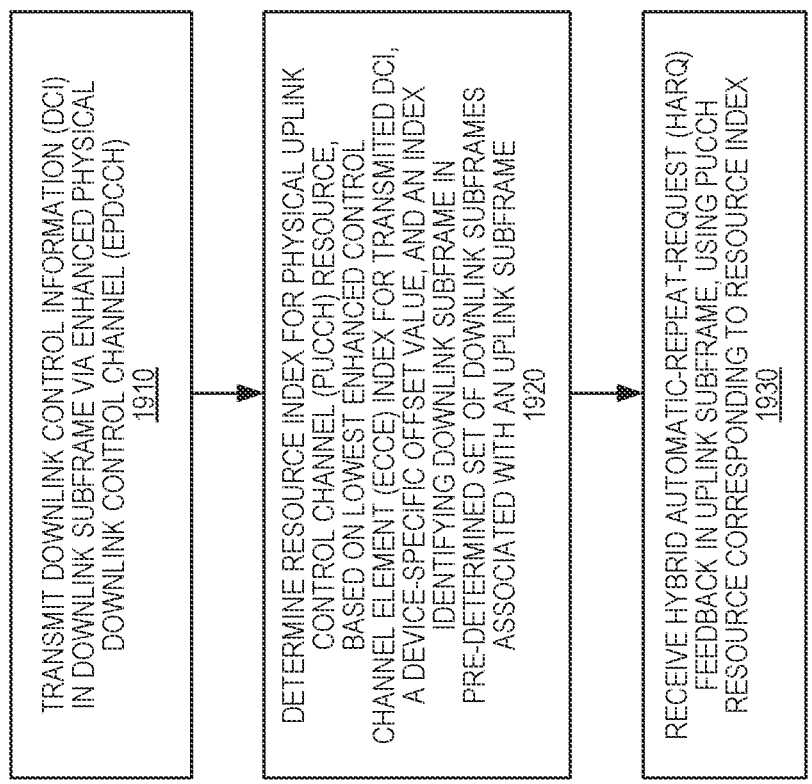
FIG. 19 is a logic flow diagram of one embodiment of a method of processing at a network node.

As noted earlier, the operations carried out by a wireless device 12 in determining the PUCCH resource and transmitting HARQ feedback in that resource are complemented by corresponding operations in a network node 10, e.g., an LTE eNB, in determining the PUCCH resource used by the wireless device 12 and receiving the HARQ feedback in that resource. FIG. 19 thus illustrates a non-limiting example embodiment of a processing method 1900, which corresponds to this processing for a network node 10, for at least embodiment 1. Method 1900 is thus generally directed to a technique for determining the resources for receiving hybrid automatic-repeat-request (HARQ) feedback in a wireless communication network configured for time-division duplexing (TDD) operation. The method begins, as shown at block 1910, with transmitting downlink control information (DCI) to a wireless device, via an Enhanced Physical Downlink Control Channel (ePDCCH) in a downlink subframe. The transmitted ePDCCH schedules a downlink shared channel transmission to the wireless device or indicates a release of semi-persistent scheduling (SPS) to the wireless device.

As shown at block 1920, the method continues with determining a resource index for a Physical Uplink Control Channel (PUCCH) resource based on the lowest enhanced Control Channel Element (eCCE) index of the transmitted DCI, a device-specific offset value previously signaled to the wireless device via Radio Resource Control (RRC) signaling, and an index i. The index i identifies the downlink subframe in a pre-determined set of one or more downlink subframes associated with an uplink subframe. The determining of the PUCCH resource is performed according to a formula that results in a sequential allocation of PUCCH resources in the uplink subframe with respect to the downlink subframes associated with the uplink subframe, for each of a plurality of sets of ePDCCH resources. As shown at block 1910, the method continues with the receiving of HARQ feedback in the uplink subframe, using a PUCCH resource that corresponds to the resource index.

In some embodiments, such as those described above under the heading "Embodiment 1," determining the resource index for the PUCCH resource comprises determining the resource index based on the sum of (i) the lowest enhanced eCCE of the transmitted DCI, (ii) the device-specific offset value previously signaled to the wireless device via RRC signaling, and (iii) the product of the index i and the number of eCCEs in a set of ePDCCH resources that includes those ePDCCH resources used by the transmitted ePDCCH. In some of these embodiments, determining the resource index comprises calculating the resource index according to equation (2), as set forth above.

With the above examples in mind, it should be clear that the teachings herein provide several solutions for PUCCH resource determination for HARQ-ACK transmission in response to ePDCCH-scheduled PDSCH or ePDCCH-indicated SPS release in a TDD system. The different alternatives provide different tradeoffs among PUCCH blocking probability, PUCCH resource utilization efficiency, eNB scheduler complexity and implementation complexity.

It will be appreciated by the person of skill in the art that various modifications may be made to the above described embodiments without departing from the scope of the present invention. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method in a wireless device operating in a wireless communication network configured for time-division duplexing (TDD) operation, said method comprising:
receiving downlink control information (DCI) via a control channel in a downlink subframe, the received downlink control channel scheduling a downlink shared channel transmission to the wireless device;
determining a resource index for an uplink control channel resource based on a device-specific offset value previously signaled to the wireless device and an index i, wherein the index i identifies the downlink subframe in a pre-determined set of one or more downlink subframes associated with an uplink subframe, wherein said determining is according to a formula that results in a sequential allocation of uplink control channel resources in the uplink subframe with respect to the downlink subframes associated with the uplink subframe, for each of a plurality of sets of downlink control channel resources; and
transmitting hybrid automatic-repeat-request (HARQ) feedback in the uplink subframe, using an uplink control channel resource corresponding to the resource index.

2. The method of claim 1, wherein determining the resource index for the uplink control channel resource comprises determining the resource index based on the sum of (i) the lowest control channel element of the received DCI, (ii) the device-specific offset value previously signaled to the wireless device, and (iii) the product of the index i and the number of control channel elements in a set of downlink control channel resources that includes those downlink control channel resources used by the received downlink control channel.

3. The method of claim 2, wherein the set of downlink control channel resources is set q of a plurality of sets of downlink control channel resources, wherein the uplink subframe is subframe n and the downlink subframe is subframe $n-k_i$, where $k_i$ is the i-th element in the pre-determined set of downlink subframes associated with subframe n, the pre-determined set comprising M elements indexed according to $k_0, k_1, \ldots, k_{M-1}$, and wherein determining the resource index comprises calculating:

$$n_{PUCCH,i}^{(1)} = i \cdot N_q^{eCCE} + n_{eCCE,i} + N_{UE\text{-}PUCCH}^{(q)},$$

where $n_{eCCE,i}$ is the lowest control channel element index of the received DCI and $N_q^{eCCE}$ is the number of control channel elements in downlink control channel resource set q, wherein the resource index is derived from $n_{PUCCHi}^{(1)}$.

4. A wireless device configured for operation in a wireless communication network and comprising
a communication interface configured for communicating with one or more network nodes in the wireless communication network and adapted to receive downlink control information via a downlink control channel in a downlink subframe, the received downlink control channel scheduling a downlink shared channel transmission to the wireless device, and
one or more processing circuits configured to control the communication interface, wherein the processing circuits are adapted to:
determine a resource index for an uplink control channel resource based on a device-specific offset value previously signaled to the wireless device and an index i, wherein the index i identifies the downlink subframe in a pre-determined set of one or more downlink subframes associated with an uplink subframe, wherein said determining is according to a formula that results in a sequential allocation of uplink control channel resources in the uplink subframe with respect to the downlink subframes associated with the uplink subframe, for each of a plurality of sets of downlink control channel resources; and
control the communication interface to transmit hybrid automatic-repeat-request (HARQ) feedback in the uplink subframe, using an uplink control channel resource corresponding to the resource index.

5. The wireless device of claim 4, wherein the processing circuit is configured to determine the resource index for the uplink control channel resource based on the sum of (i) the lowest control channel element of the received DCI, (ii) the device-specific offset value previously signaled to the wireless device, and (iii) the product of the index i and the number of control channel elements in a set of downlink control channel resources that includes those downlink control channel resources used by the received downlink control channel.

6. The wireless device of claim 5, wherein the set of downlink control channel resources is set q of a plurality of sets of downlink control channel resources, wherein the uplink subframe is subframe n and the downlink subframe is subframe $n-k_i$, where $k_i$ is the i-th element in the pre-determined set of downlink subframes associated with subframe n, the pre-determined set comprising M elements indexed according to $k_0, k_1, \ldots, k_{M-1}$, and wherein determining the resource index comprises calculating:

$$n_{PUCCH,i}^{(1)} = i \cdot N_q^{eCCE} + n_{eCCE,i} + N_{UE\text{-}PUCCH}^{(q)},$$

where $n_{eCCE,i}$ is the lowest control channel element index of the received DCI and $N_q^{eCCE}$ is the number of control channel elements in downlink control channel resource set q, wherein the resource index is derived from $n_{PUCCHi}^{(1)}$.

7. A method in a network node operating in a wireless communication network configured for time-division duplexing (TDD) operation, said method comprising:
transmitting downlink control information (DCI) to a wireless device via a downlink control channel in a downlink subframe, the transmitted downlink control channel scheduling a downlink shared channel transmission to the wireless device;
determining a resource index for an uplink control channel resource based on a device-specific offset value previously signaled to the wireless device and an index i, wherein the index i identifies the downlink subframe in a pre-determined set of one or more downlink subframes associated with an uplink subframe, wherein said determining is according to a formula that results in a sequential allocation of uplink control channel resources in the uplink subframe with respect to the downlink subframes associated with the uplink subframe, for each of a plurality of sets of downlink control channel resources; and
receiving hybrid automatic-repeat-request (HARQ) feedback from the wireless device in the uplink subframe, using an uplink control channel resource corresponding to the resource index.

8. The method of claim 7, wherein determining the resource index for the uplink control channel resource comprises determining the resource index based on the sum of (i) the lowest control channel element of the received DCI, (ii) the device-specific offset value previously signaled to the wireless device, and (iii) the product of the index i and the number of control channel elements in a set of downlink control channel resources that includes those downlink control channel resources used by the transmitted downlink control channel.

9. The method of claim 8, wherein the set of downlink control channel resources is set q of a plurality of sets of downlink control channel resources, wherein the uplink subframe is subframe n and the downlink subframe is subframe $n-k_i$, where $k_i$ is the i-th element in the pre-determined set of downlink subframes associated with subframe n, the pre-determined set comprising M elements indexed according to $k_0, k_1, \ldots, k_{M-1}$, and wherein determining the resource index comprises calculating:

$$n_{PUCCH,i}^{(1)} = i \cdot N_q^{eCCE} + n_{eCCE,i} + N_{UE\text{-}PUCCH}^{(q)},$$

where $n_{eCCE,i}$ is the lowest control channel element index of the received DCI and $N_q^{eCCE}$ is the number of control channel elements in downlink control channel resource set q, wherein the resource index is derived from $n_{PUCCHi}^{(1)}$.

10. A network node configured for operation in a wireless communication network and comprising:
a communication interface configured for communicating with one or more wireless devices in the wireless communication network and adapted to transmit downlink control information (DCI) to a wireless device via a downlink control channel in a downlink subframe, the transmitted downlink control channel scheduling a downlink shared channel transmission to the wireless device, and
one or more processing circuits configured to control the communication interface, wherein the processing circuits are adapted to:

determine a resource index for an uplink control channel resource based on a device-specific offset value previously signaled to the wireless device and an index i, wherein the index i identifies the downlink subframe in a pre-determined set of one or more downlink subframes associated with an uplink subframe, wherein said determining is according to a formula that results in a sequential allocation of uplink control channel resources in the uplink subframe with respect to the downlink subframes associated with the uplink subframe, for each of a plurality of sets of downlink control channel resources; and, using the communication interface, receive hybrid automatic-repeat-request (HARQ) feedback in the uplink subframe, using an uplink control channel resource corresponding to the resource index.

11. The network node of claim 10, wherein the processing circuit is configured to determine the resource index for the uplink control channel resource based on the sum of (i) the lowest control channel element of the received DCI, (ii) the device-specific offset value previously signaled to the wireless device, and (iii) the product of the index i and the number of control channel elements in a set of downlink control channel resources that includes those downlink control channel resources used by the transmitted downlink control channel.

12. The network node of claim 11, wherein the set of downlink control channel resources is set q of a plurality of sets of downlink control channel resources, wherein the uplink subframe is subframe n and the downlink subframe is subframe $n-k_i$, where $k_i$ is the i-th element in the pre-determined set of downlink subframes associated with subframe n, the pre-determined set comprising M elements indexed according to $k_0, k_1, \ldots, k_{M-1}$, and wherein determining the resource index comprises calculating:

$$n_{PUCCH,i}^{(1)} = i \cdot N_q^{eCCE} + n_{eCCE,i} + N_{UE\text{-}PUCCH}^{(q)},$$

where $n_{eCCE,i}$ is the lowest control channel element index of the received DCI and $N_q^{eCCE}$ is the number of control channel elements in downlink control channel resource set q, wherein the resource index is derived from $n_{PUCCH,i}^{(1)}$.

* * * * *

UNITED STATES PATENT AND TRADEMARK OFFICE
CERTIFICATE OF CORRECTION

PATENT NO. : 11,178,649 B2
APPLICATION NO. : 16/666597
DATED : November 16, 2021
INVENTOR(S) : Song et al.

It is certified that error appears in the above-identified patent and that said Letters Patent is hereby corrected as shown below:

In the Specification

In Column 2, Line 43, delete "Symbols (DMRS)." and insert -- Signals (DMRSs). --, therefor.

In Column 13, Line 9, delete "ePDDCH" and insert -- ePDCCH --, therefor.

In Column 15, Line 20, delete "$k_i \in \{c\ k_1, k_2, \ldots k_{M-1}\}$" and insert -- $k_i \in \{k_1, k_2, \ldots k_{M-1}\}$ --, therefor.

In Column 16, Lines 31-35, delete
"$$V_c = \left\{ c \mid [N_C^{eCCE}(c), N_C^{eCCE}(c+1)] \in \bigcup_k \left( [N_{UE\text{-}PUCCH}^{(q)}, N_{UE\text{-}PUCCH}^{(q)} + N_q^{eCCE}] \right) \right\}.$$" and insert
-- $$V_c = \left\{ c \mid [N_C^{eCCE}(c), N_C^{eCCE}(c+1)] \in \bigcup_k \left( [N_{UE\text{-}PUCCH}^{(q)}, N_{UE\text{-}PUCCH}^{(q)} + N_q^{eCCE}] \right) \right\}.$$ --, therefor.

In Column 17, Line 45, delete "(HARD)" and insert -- (HARQ) --, therefor.

In the Claims

In Column 21, Line 15, in Claim 3, delete "$n_{PUCCH,i}^{(1)}$." and insert -- $n_{PUCCH,i}^{(1)}$. --, therefor.

In Column 22, Line 3, in Claim 6, delete "$n_{PUCCH,i}^{(1)}$." and insert -- $n_{PUCCH,i}^{(1)}$. --, therefor.

Signed and Sealed this
Second Day of January, 2024

Katherine Kelly Vidal
*Director of the United States Patent and Trademark Office*

CERTIFICATE OF CORRECTION (continued)
U.S. Pat. No. 11,178,649 B2

In Column 22, Line 54, in Claim 9, delete "$n_{PUCCHi}^{(1)}$." and insert -- $n_{\text{PUCCH}i}^{(1)}$ --, therefor.

In Column 24, Line 21, in Claim 12, delete "$n_{PUCCHi}^{(1)}$." and insert -- $n_{\text{PUCCH}i}^{(1)}$ --, therefor.